US007908937B2

(12) United States Patent
Bratton et al.

(10) Patent No.: US 7,908,937 B2

(45) Date of Patent: *Mar. 22, 2011

(54) METHOD TO DETECT AND CHARACTERIZE CONTAMINANTS IN PIPES AND DUCTS WITH INTERACTIVE TRACERS

(75) Inventors: Wesley L. Bratton, Richland, WA (US); Joseph W. Maresca, Jr., Sunnyvale, CA (US)

(73) Assignee: Vista Engineering Technologies LLC, Kennewick, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,458

(22) Filed: Jun. 24, 2008

(65) Prior Publication Data

US 2008/0274553 A1 Nov. 6, 2008

Related U.S. Application Data

(63) Continuation of application No. 11/356,915, filed on Feb. 16, 2006, now Pat. No. 7,389,706, which is a continuation of application No. 10/618,451, filed on Jul. 10, 2003, now Pat. No. 7,047,830.

(60) Provisional application No. 60/395,189, filed on Jul. 10, 2002.

(51) Int. Cl.
*G01M 19/00* (2006.01)
*G01N 37/00* (2006.01)

(52) U.S. Cl. .......... 73/865.8; 73/61.62; 436/56; 436/52; 422/62

(58) Field of Classification Search ................. 73/28.01, 73/28.04, 28.05, 28.06, 40.7, 61.62, 863.22, 73/863.23, 865.8; 422/62; 436/52, 56
See application file for complete search history.

(56) References Cited

U.S. PATENT DOCUMENTS

| | | | | | |
|---|---|---|---|---|---|
| 3,672,207 | A | * | 6/1972 | Cramp et al. | 73/40.7 |
| 3,889,120 | A | * | 6/1975 | Greaney | 250/356.2 |
| 4,223,727 | A | * | 9/1980 | Sustek et al. | 166/250.03 |
| 4,742,873 | A | * | 5/1988 | Craig, III | 166/252.6 |
| 4,773,255 | A | * | 9/1988 | Malcosky et al. | 73/40.7 |
| 4,783,314 | A | * | 11/1988 | Hoots et al. | 422/3 |
| 4,876,449 | A | * | 10/1989 | Casad et al. | 250/259 |
| 4,953,562 | A | * | 9/1990 | Rosen et al. | 600/584 |
| 5,031,697 | A | * | 7/1991 | Wellington et al. | 166/250.12 |
| 5,084,378 | A | * | 1/1992 | Crissman et al. | 435/6 |
| 5,111,882 | A | * | 5/1992 | Tang et al. | 166/252.6 |
| 5,168,927 | A | * | 12/1992 | Stegemeier et al. | 166/252.6 |
| 5,179,027 | A | * | 1/1993 | Fisher | 436/56 |
| 5,279,967 | A | * | 1/1994 | Bode | 436/56 |
| 5,413,719 | A | * | 5/1995 | Sivakumar et al. | 210/708 |
| 5,665,538 | A | * | 9/1997 | Slater et al. | 435/6 |
| 5,767,390 | A | * | 6/1998 | Chapman, IV | 73/40.7 |
| 5,892,147 | A | * | 4/1999 | Garnes et al. | 73/152.14 |
| 5,905,036 | A | * | 5/1999 | Pope et al. | 435/262 |
| 5,939,679 | A | * | 8/1999 | Olsson | 174/113 C |
| 5,981,283 | A | * | 11/1999 | Anderson et al. | 436/27 |
| 6,003,365 | A | * | 12/1999 | Pope et al. | 73/152.39 |

(Continued)

*Primary Examiner* — Lisa M Caputo
*Assistant Examiner* — Punam Roy
(74) *Attorney, Agent, or Firm* — David H. Jaffer; Pillsbury Winthrop Shaw Pittman LLP

(57) ABSTRACT

A method and an apparatus for detecting, locating, and quantifying contamination in a fluid flow system like a pipe or duct. This characterization technique uses a conservative and one or more interactive tracers that are injected into the fluid flow system and then monitored at another location in the system. Detection, location, and quantification are accomplished by analysis of the characteristic features of measured curves of tracer concentration.

20 Claims, 15 Drawing Sheets

U.S. PATENT DOCUMENTS

| | | | | |
|---|---|---|---|---|
| 6,035,701 | A * | 3/2000 | Lowry et al. | 73/40.7 |
| 6,243,657 | B1 * | 6/2001 | Tuck et al. | 702/150 |
| 6,321,595 | B1 * | 11/2001 | Pope et al. | 73/152.39 |
| 6,329,165 | B1 * | 12/2001 | Chattoraj et al. | 435/29 |
| 6,359,645 | B1 * | 3/2002 | Sivacoe | 348/84 |
| 6,427,602 | B1 * | 8/2002 | Hovis et al. | 104/138.1 |
| 6,587,753 | B2 * | 7/2003 | Fowee | 700/266 |
| 6,645,769 | B2 * | 11/2003 | Tayebi et al. | 436/56 |
| 6,730,227 | B2 * | 5/2004 | Zeiher et al. | 210/650 |

* cited by examiner a) Reactive tracer concentration curves when there is no contamination present.

b) Reactive tracer concentration curves when contamination is encountered in the test zone

METHOD TO DETECT AND CHARACTERIZE CONTAMINANTS IN PIPES AND DUCTS WITH INTERACTIVE TRACERS

This application is a continuation of U.S. patent application Ser. No. 11/356,915 filed Feb. 16, 2006, now U.S. Pat. No. 7,389,706 which is a continuation of U.S. patent application Ser. No. 10/618,451 filed Jul. 10, 2003 (now U.S. Pat. No. 7,047,830), which claims priority from U.S. Provisional Patent Application Ser. No. 60/395,189 filed Jul. 10, 2002.

BACKGROUND OF THE INVENTION

1. Field of the Invention

A method and an apparatus for characterizing contaminants of interest in a fluid flow system like a pipe, duct, or channel using interactive tracers. Various types of interactive tracers may be used, including reactive and partitioning tracer gases and liquids. The method works on fluid flow systems using gaseous tracers in which the liquid contents have been removed or are partially removed. The method will also work for fluid flow systems that filled or partially filled with a liquid. The tracers are selected to detect, locate, and measure the concentration of specific contaminants of interest. These contaminants may accumulate as a liquid, film, residue, or particulate build-up on the walls of the system, in low elevation points, or at appurtenances and geometric constrictions or flow constrictions. This method has application for characterizing contamination in pipe and ducts that once contained chlorinated solvents, petroleum products, radioactive materials, heavy metals or other types of hazardous substances and hazardous waste. This invention has immediate application for decontamination and deactivation (D&D) activities at the U.S. Department of Energy's (DOE's) nuclear sites, such as the Hanford Site, and various industrial and petroleum facilities. This invention also determines when the decontamination operations have been successfully completed.

2. Brief Description of Prior Art

Within the U.S. Department of Energy (DOE) inventory, there are several thousand miles of piping and ductwork from facilities throughout the United States that are ready for deactivation and decommissioning (D&D). A similar problem exists in industrial and chemical/petroleum facilities that are taken out of service for closure or for maintenance and cleaning. These piping systems have been used to move various types of contaminated fluids (liquids and gases) from one area to another within a facility. The ductwork moved air within the facilities through ventilation systems. Over the course of the operation of these facilities, these passageways have become contaminated with the residual hazardous and radioactive materials that they transported. Chlorinated solvents such as trichlorethylene (TCE) and carbon tetrachloride ($CCl_4$) which were used as degreasers at many industrial complexes both within the DOE and the Department of Defense (DOD) facilities, are an examples. Many of the piping systems or large sections of piping are inaccessible and external inspection techniques that require access to the outside wall of the pipe cannot be used. Many of the pipes are buried underground, or are located beneath the floor of a building or beneath paved areas. Because direct access to the external pipe wall is not frequently possible, methods that involve internal inspection of the pipe need to be used. These methods generally require that any liquid in the pipe be removed before the inspection method can be applied.

A common measurement approach for determining whether or not a pipe of duct is contaminated is to use a camera to inspect the inside of the pipe. For short sections of pipe, a small camera is inserted into the pipe on a cable. For example, in U.S. Pat. No. 6,359,645, Sivacoe describes a method of inspecting a pipe, by pushing a video camera through the pipe on a cable. In U.S. Pat. No. 5,939,679, Olsson describes an electromechanical system for inspecting the inside of pipes over distances of several hundred feet for defects and obstructions using a push-cable that mechanically and electrically connects a video camera head to a push reel and video circuit. In addition to cable-inspection systems, a "pig" can be inserted into the pipe to inspect the pipe wall for integrity over the entire length of the pipe. In U.S. Pat. No. 6,243,657, Tuck, et. al., describes a pipe wall inspection system using a pig having an inertial measurement unit and a magnetic sensing system for finding wall anomalies.

A camera and other pipe inspection sensors can be mounted on a robotic vehicle, which is inserted into the pipe and allowed to move down the pipe. For example, in U.S. Pat. No. 6,427,602, Hovis, et. al., describes a crawler for inspection of the integrity of 3- to 4-in. diameter piping, where the crawler can carry sensors or a camera to perform the inspection. This approach is acceptable for larger diameter piping, but for small piping, the robotic vehicle may be too large to be used or not be able to move past bends and constrictions in the pipe. The robotic vehicle can be instrumented with a camera, chemical sensors, and sample collectors. Where access to the pipe is possible, the pipe is sometimes cut and analyzed for contamination in the laboratory.

In general, most methods of finding contamination require the insertion of a physical device into the pipe such as a cable, crawler, or pig. There are many nondestructive pipe inspection techniques, some of which are added to these physical delivery systems, and some of which propagate down the pipe. Most of these methods and apparatuses involve the use of nondestructive testing techniques such as eddy current, ultrasonic, and magnetic flux sensing technologies and all of these technologies involve assessing the integrity of the wall of the pipe, not finding contamination in the pipe.

As DOE begins decontaminating and decommissioning of their facilities, innovative methods to determine the type and level of contamination that is present in the pipe and ductwork are needed for cost-effective and safe D&D operations. DOE has been seeking methods that improve the cost, efficiency, effectiveness and safety of these activities. Non-invasive or minimally invasive methods are sought.

The method of the present invention uses tracers to characterize the contamination in the pipe, where at least one of the tracers does not interact with the contaminant of interest in the pipe, and one or more tracer do. Tracers have been used for characterizing subsurface contamination between monitoring wells such as Dense Non-Aqueous Phase Liquids (DNAPLs), Non-Aqueous Phase Liquids (NAPLs), and Light Non-Aqueous Phase Liquids (LNAPL's) such as unleaded gasoline and diesel. Such methods have been used in both the saturated zone using the natural groundwater flow at the tracer carrier fluid or in the vadose zone using an established air flow field as the tracer carrier. In U.S. Pat. No. 6,321,595, Pope, et. al., teaches a method of characterization of organic contaminants in subsurface formations such as nonaqueous phase liquids by injecting partitioning and non-partitioning tracers at one well point and measuring the arrival times of these tracers at another well point. This subsurface tracer approach has also been used to detect releases of a hazardous liquids from underground and aboveground storage tanks. While none of these approaches have been used to identify the presence of contamination inside a pipe or a duct, these methods have identified a variety of partitioning tracers that can be used in the method of the present invention for characterizing contamination in fluid flow systems such as pipe and ducts, which in many instances is the source of the subsurface contamination.

Various tracer methods have also been used for detecting and locating a hole in a tank or a pipe, but none of these methods are used to find contamination in the tank or pipe.

There are a number of important advantages of the method of the present invention over the physical delivery systems currently used for characterizing contamination in pipe and ductwork. The first advantage of the proposed invention is that the same procedure will work on pipes (or ducts) of any size and nearly any length. Tracers are just as easily injected into a small diameter pipe (e.g., 0.5 in.) as they are into larger diameter pipe (e.g., 12 in.). Other remote pipe inspection equipment, which transport cameras by crawlers into a pipe, require pipe diameters of 4 in. or larger for entry and operation. Many of the pipelines within building systems are on the order of 0.5 to 2.0 inches, making inspection using cameras nearly impossible.

The second advantage of the proposed invention is that the injected tracers can easily navigate pipe (or duct) bends and other pipe irregularities with ease compared to remotely operated inspection equipment. Tight bends and changes in diameter are not a problem for the tracer gases, yet represent major hurdles for other characterization techniques. Gas tracers also inspect the entire surface of the pipe, including any crevices or nooks that may be difficult to inspect using video approaches. This will result in a more complete and thorough inspection of the pipe (or duct).

The third advantage of the proposed invention is that there are no moving parts or equipment that has to enter the pipe. For pipes or ducts that may contain explosive vapors or contaminants that could ignite, the partitioning tracer technique offers a characterization approach that remains safe. In addition, since no mechanical equipment enters the pipe, this eliminates the possibility of equipment malfunction or getting “stuck” and “plugging” the pipe (or duct).

The fourth advantage is that equipment contamination and de-contamination is avoided. This has both safety and cost implications. Because no equipment enters the pipe, there is no equipment that must be decontaminated when it exits the pipes. This reduces the amount of investigation-derived wastes that need to be disposed of properly.

The fifth advantage of the proposed invention is that it can be operated more cost effectively and more safely than other techniques without sacrificing performance. In fact, the performance of the proposed invention should be better than the more conventional methods.

In addition to being a very advantageous approach for the end users, the proposed invention can also be used in a variety of detection and measurement scenarios. The most common scenario is to characterize a pipeline or duct system to determine if the pipeline has any residual contamination that must be removed before the pipe or duct can be decommissioned or released. The proposed invention can also be used before and after a decontamination event to validate the amount of contamination that has been removed from the pipeline by a particular decontamination technology. Finally, the proposed invention can also be used to routinely monitor pipelines and ductwork to monitor any residual buildup of contaminants that could reduce efficiency of the pipeline.

The method described is motivated by the D&D need. As a consequence, it is described in terms of gaseous tracers, because in most D&D activities, all of the liquid contents of the pipe are removed before any attempt to clean the pipe is done. Cleaning is typically done by flushing the pipe with water or some other cleaning chemical. The liquid used to flush the pipe is removed before any attempt to determine if any residual contamination exists. With properly selected interactive tracers, the method of the present invention can be applied using either gaseous or liquid tracers.

SUMMARY OF THE INVENTION

It is the object of this invention to provide a method and an apparatus for characterizing contamination that is present in a in a fluid flow system such as a pipe, duct, channel, or other type of containment system.

It is another object of this invention to provide a method and an apparatus for detecting the presence of specific contaminants in a fluid flow system.

Another object of this invention to provide a method and an apparatus for determining the concentration of specific contaminants (quantification) detected in a fluid flow system.

Yet another object of this invention to provide a method and an apparatus for determining the location of the contaminants detected in a fluid flow system.

Another object of this invention is to provide a method and an apparatus for determining whether or not a fluid flow system is free of specific contaminants of interest.

Still another object of this invention is to provide a method and an apparatus for determining whether or not a fluid flow system that has been cleaned is free of specific contaminants of interest.

The method and apparatus of the present invention requires the injection of a “slug” of two or more tracers into a fluid flow system, where at least one of the tracers interacts with the contaminant of interest and at least one of the tracers does not. The tracers are injected into the fluid flow system at one location, and then the tracers are extracted at another location in the system. At least one of the tracers does not interact with the contaminant or the other tracers, and this non-interactive tracers is used as a reference to determine the changes that occur to the tracers that do interact with the contaminant. Another fluid, which does not interact with any of the tracers or the contaminant, is used to advect or transport the tracers from the injection point to the extraction point in the system. The concentration of the extracted tracers are then measured as a function of time or for a specific period of time. The magnitude of the measured concentration or the temporal history of the measured concentration of the interactive tracers relative to the non-interactive or reference tracers are used to detect, quantify and locate the contaminant of interest.

Alternatively, another approach is to introduce enough conservative and partitioning tracer at the beginning of the pipe test to cover the entire pipe, then stop the flow and isolate both ends of the pipe to trap the tracer inside the pipe by closing the valves on the injection and extraction side of the pipe. After a period of time, an advection flow field is established, and GC samples are collected and analyzed. This approach can be used to detect, quantify and locate the contaminant.

Liquid tracers will be used if the pipe fluid is a liquid, and the liquid has not been removed. For many applications, it is common to remove as much as the liquid as possible before examining the fluid flow system for contamination. The contaminant may be residual pools that remain after the liquid has been removed from the fluid flow system. The contaminant may also be a coating, slurry, or other residue that also remains after if the residual pools of liquid evaporate. Gaseous tracers will be used for application to fluid flow systems in which the liquid normally contained in the system has been removed. The method and apparatus of the present invention will be described in terms of gaseous tracers. However, the same method is applicable for fluid flow system containing a liquid.

Both reactive and partitioning gaseous tracers can be used in the method of the present invention. The concentration of a reactive tracer will decrease after the tracer interacts with a contaminant; also, the chemical composition or physical properties of the reactive tracer may change. Detection is accomplished by using this loss of concentration. The concentration of a partitioning tracer will only temporarily decrease after the tracer interacts with a contaminant. The partitioning tracer initially interacts with the contaminant, and then re-enters the fluid flow system at a later point in time in accordance with its partitioning properties. Detection is accomplished by using this initial loss of concentration, or the difference in the time of arrival of the tracers, or the resulting changes in the temporal distribution of the measured concentration at the extraction point. Each type of tracer has its advantages, and one or both types may be used together. The selection of the type of tracer depends on the nature of the contaminant to be characterized.

The method and apparatus of the preferred embodiment of the present invention is applied using gaseous partitioning tracers. FIG. 1 is a simplified illustration of the preferred embodiment of the present invention. The method and apparatus of the present invention requires the injection of a "slug" of two or more tracers into a fluid flow system with different partitioning coefficients ($K_i$). One of the tracers is a conservative tracer, i.e., it will not dissolve, adhere, or interact with the contaminant of interest. The other tracer or tracers, are selected so they will dissolve, adhere or interact with the contaminant of interest. The tracers are transported or advected from the injection point (at one location in the pipe) to one or more extraction points (at other locations in the pipe) by a gas flow field established in the pipe prior to the injection of the tracers. The gas flow field used to transport the tracers is typically nitrogen, because it does not generally interact with the tracers or the contaminants in the fluid flow system. The velocity of the advection flow field is selected so that the tracers have enough time to fully dissolve, adhere or interact with the contaminants before the leading edge of the tracer reaches the extraction point. At that point, no more tracer is introduced into the line. By measuring the time history of the concentration of the partitioning and conservative tracers at the extraction point in the pipe, the presence and amount of the contaminant within the pipe or duct can be determined. Detection and quantification can be accomplished using the difference in the mean arrival time of the partitioning and conservative tracers, or the difference in the levels of concentration between the conservative and partitioning tracers. The location of the contaminant can be determined by introducing a perturbation to the advection flow field or flushing the conservative and partitioning tracers in the line, and then measuring the mean time of arrival of the partitioning tracers that are still being eluted from the contamination in the system. This characterization method is referred to as PCUT (Pipeline Characterization Using Tracers).

IN THE DRAWINGS

Figure 1:
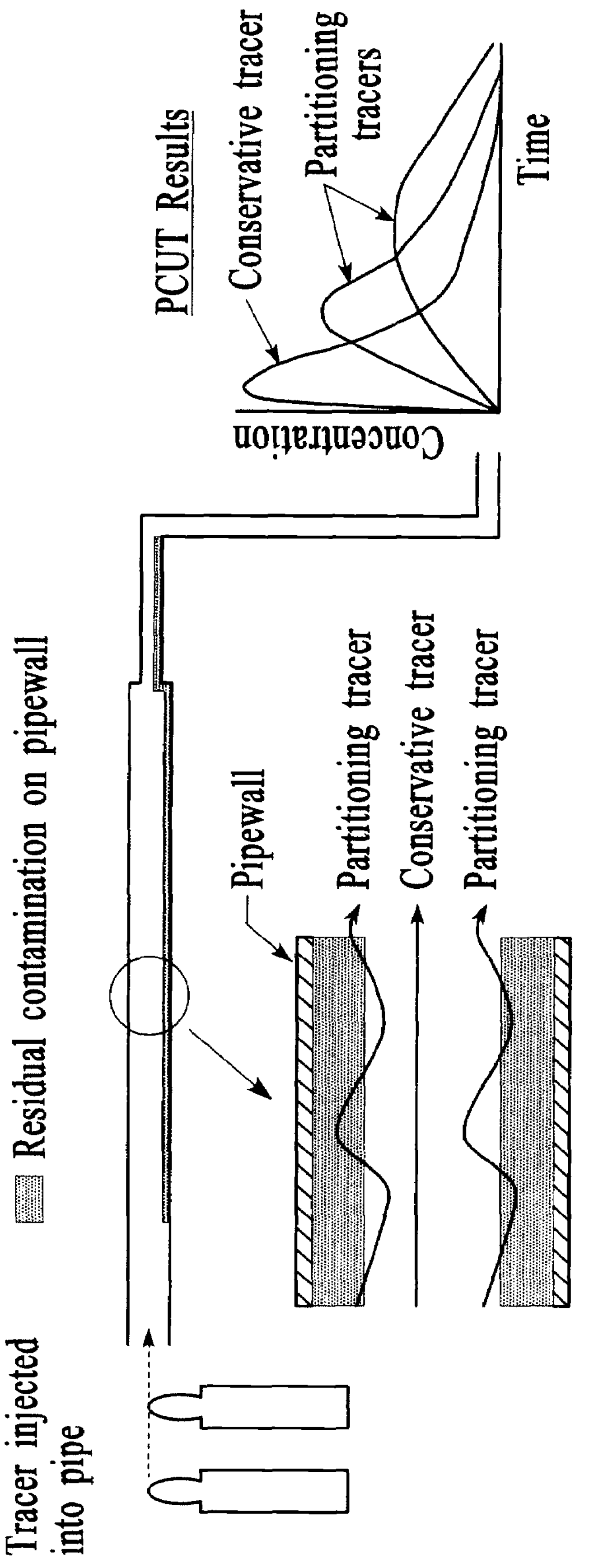
FIG. 1 is a simplified illustration of the preferred embodiment of the present invention using gaseous partitioning tracers. The time history of the elution curves of tracer concentration for both the conservative and the partitioning tracers are shown.

FIG. 15*a* illustrates tracer elution time histories for reactive tracers without contamination.

FIG. 15*b* illustrates tracer elution time histories for reactive tracers with contamination.

DESCRIPTION OF THE PREFERRED EMBODIMENT

The preferred method of the present invention uses gaseous tracers to characterize contamination in a fluid flow system such as a pipe or duct, where characterization may include detection, quantification, or location of the contaminant in the system. The preferred method of the present invention injects and transports at least one gaseous conservative tracer and one or more gaseous partitioning tracers of known concentrations at a constant or known flow rate and flow velocity along a pipe using a gas that does not interact with any of the tracers or the contaminant. A gas chromatograph (GC) is used to measure the elution curves of tracer concentration at the other end of the pipe. The partitioning tracer or tracers are selected so that they interact with the contamination of interest as it flows along the pipe. Any interaction will change the magnitude and shape of the elution curves of concentration measured at the end of the pipe and introduce a delay in the average flow time. The conservative tracer, which does not interact with the contamination, is unaffected and acts as a reference. The difference in the mean arrival times or the magnitude and shape of the elution curves of concentration for the conservative and partitioning tracers are used to detect the presence of the contaminant in the pipe. Using a very simple model, the amount of contamination can be determined from the difference the mean arrival times of the conservative and interactive tracer determined from the elution curves of tracer concentration.

A perturbation in the partitioning tracer flow field must be induced to locate the position of the contaminant in the pipe. This flow field variation can be introduced any time after the partitioning tracer has reached and begun partitioning into the contamination. This can be determined from the time history of the normalized concentration curves. As will be illustrated in FIG. 9, for $C_7F_{14}$, this can occur any time after 20 to 24 h when the peak of the normalized concentration of the partitioning tracers have become a fraction of the conservative tracer. The flow field perturbation can be introduced during the peak portion of the curve or the exponential region of the concentration curve. If location is to be effectively combined with detection and quantification, then the flow field variation is best done when the concentration is changing exponential and when sufficient data have been collected to accurately extrapolate the exponential portion of the curve to zero.

The flow-field perturbation is produced by suddenly increasing the flow rate (i.e., velocity) of the nitrogen gas used to advect the tracers along the pipe. The purpose of this increase is to flush the partitioning tracers in the flow field. Once this is accomplished, the flow field can be returned to its original flow rate. The tracers present in the contamination will continue to come out of the contamination and be advected along the pipe. However, the leading edge of the partitioning tracers re-entering the nitrogen flow field will be clearly identifiable and distinguishable from the original concentration data. The distance between the contamination and the GC can be estimated by a measurement of the time of arrival of the partitioning tracer and the flow rate. The advection velocity does not have to be the same before and after the flushing, but it does have to be known.

The time of arrival can be estimated from the leading edge, the peak, or the first temporal moment of the concentration curve depending on what estimate of location is desired. The leading edge estimate will yield an estimate of the location of the tracer closest to the GC. The peak, first temporal moment, or other estimate of average arrival time will yield an estimate of the extent (i.e., length or beginning and end) of the contamination. If location and detection estimates are initially desired (not volume estimates), then the flow-field perturbation should be introduced near the beginning of the concentration curve to allow a quick test to be conducted. If a contaminant is found, the test can be repeated over a longer period of time if an estimate of the volume of contamination is desired.

Another approach is to introduce enough conservative and partitioning tracer at the beginning of the test to cover all sections of the pipe, then stop the flow and close both ends of the pipe to trap the tracer inside the pipe by closing the valves on the injection and extraction side of the pipe. After a period of time, an advection flow field is established and GC samples are collected and analyzed. This approach can be used to detect, quantify and locate the contaminant.

In any length of pipe, there may be more than one region of contamination. For such cases, the concentration curve measured at the GC will be the summation of the elution from each region of contamination. The measured concentration curve will show multiple peaks.

The key feature of the present invention is that a suite of tracers are transported down a length of pipe and come in contact with any and all possible contamination within the pipe. The conservative tracer will not interact with the contamination inside the pipe, and therefore, it has a partition coefficient of zero relative to the contamination. The partitioning tracers on the other hand will interact with the contamination, and therefore, have a non-zero partitioning coefficient. The partitioning coefficient ($K_i$) is defined as $$K_i = C_{i,D}/C_{i,M} \tag{1}$$

where $C_{i,D}$ is the concentration of the "i"th tracer in the contamination and $C_{i,M}$ is the concentration of the "i"th tracer in the mobile phase, i.e. the air transporting the tracer. The retardation of the tracers by the contamination for flow through a porous media is given by $$R_f = \frac{\langle t_p \rangle}{\langle t_c \rangle} = 1 + \frac{K_i S_D}{(1 - S_D)} \tag{2}$$

where $<t_p>$ is the mean time of travel of the partitioning tracer, $<t_c>$ is the mean time of travel of the conservative or non-partitioning tracer, and $S_D$ is the average contamination saturation, i.e. the fraction of the volume occupied by contamination in the total swept volume of the porous media. This model can be adapted for estimating $S_{Dpipe}$. The average contamination saturation for flow in a pipe or other fluid flow system, $S_{DPipe}$, is related to $S_D$, by an empirical constant, □ where □ should be approximately equal to 2 for flow in a pipe. In a pipe, only the top of the contaminant layer can interact with the tracer. In porous media, the tracer can interact with all sides of the contaminant. The values of $<t_p>$ and $<t_c>$ can be determined from the centroid of the elution curves of tracer concentration during a pipe test, and $K_i$ can be determined in laboratory calibration tests referred to as bag tests.

An estimate of the volume of the contamination can be estimated by solving Eqs. (1) and (2) for $S_{Dpipe}$, assuming $S_{Dpipe}$=□$S_D$ $$S_{DPipe} = \alpha \frac{R_f - 1}{K_i + (R_f - 1)} = \alpha \frac{\frac{\langle t_p \rangle}{\langle t_c \rangle} - 1}{K_i + \left(\frac{\langle t_p \rangle}{\langle t_c \rangle}\right) - 1}, \tag{3}$$

where □=2 for a thin layer of contamination at the bottom of a pipe.

Figure 2:
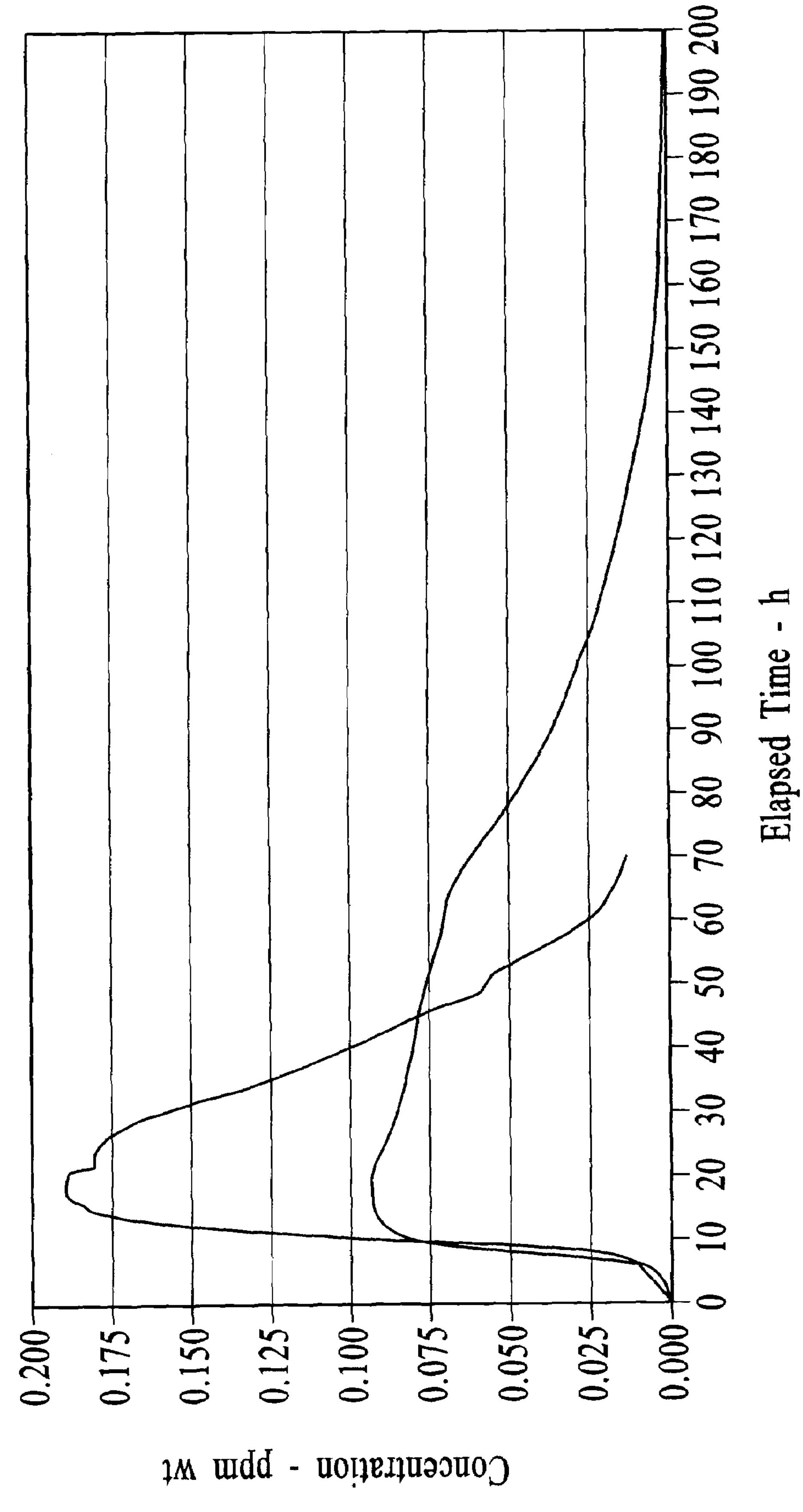
FIG. 2 illustrates the same partition tracer curve, $C_7F_{14}$, measured at the extraction point in a pipe test with and without any contamination present.

The partitioning tracers undergo retardation due to their partitioning into and out of the contamination, while the conservative tracers are unaffected by the presence of the contamination. FIG. 2 illustrates the difference in the measured concentration curves between a partitioning tracer that was injected into a pipe section free of contamination and the same pipe section when it contained a thin layer of diesel fuel contamination. The difference between tracer concentration curves with contamination and without contamination is clearly evident in FIG. 2. If a conservative tracer was also injected into the pipe section when the contamination was present, its concentration curve would be similar to the one measured without the contamination present. FIG. 2 clearly illustrates both a reduction in concentration and a time scale change due to the presence of contaminant in the pipe.

The partitioning process is caused by the mass transfer of the partitioning tracers into the contaminant until equilibrium partitioning has been reached. For this reason, the flow rate of the tracers must be designed so that sufficient time exists to allow the partitioning tracers to interact with the contaminant. Once the tracer slug has passed the contamination, the partitioning tracer elutes back into the flow field as dictated by the partitioning coefficient. Therefore, the net flux of the partitioning tracers will be from the contaminant back into the flow field to preserve the equilibrium partitioning dictated by the particular coefficient for the tracer. Thus, recovery of the partitioning tracers at the extraction point is delayed (i.e. retarded) relative to the recovery of the conservative tracer.

Figure 3:
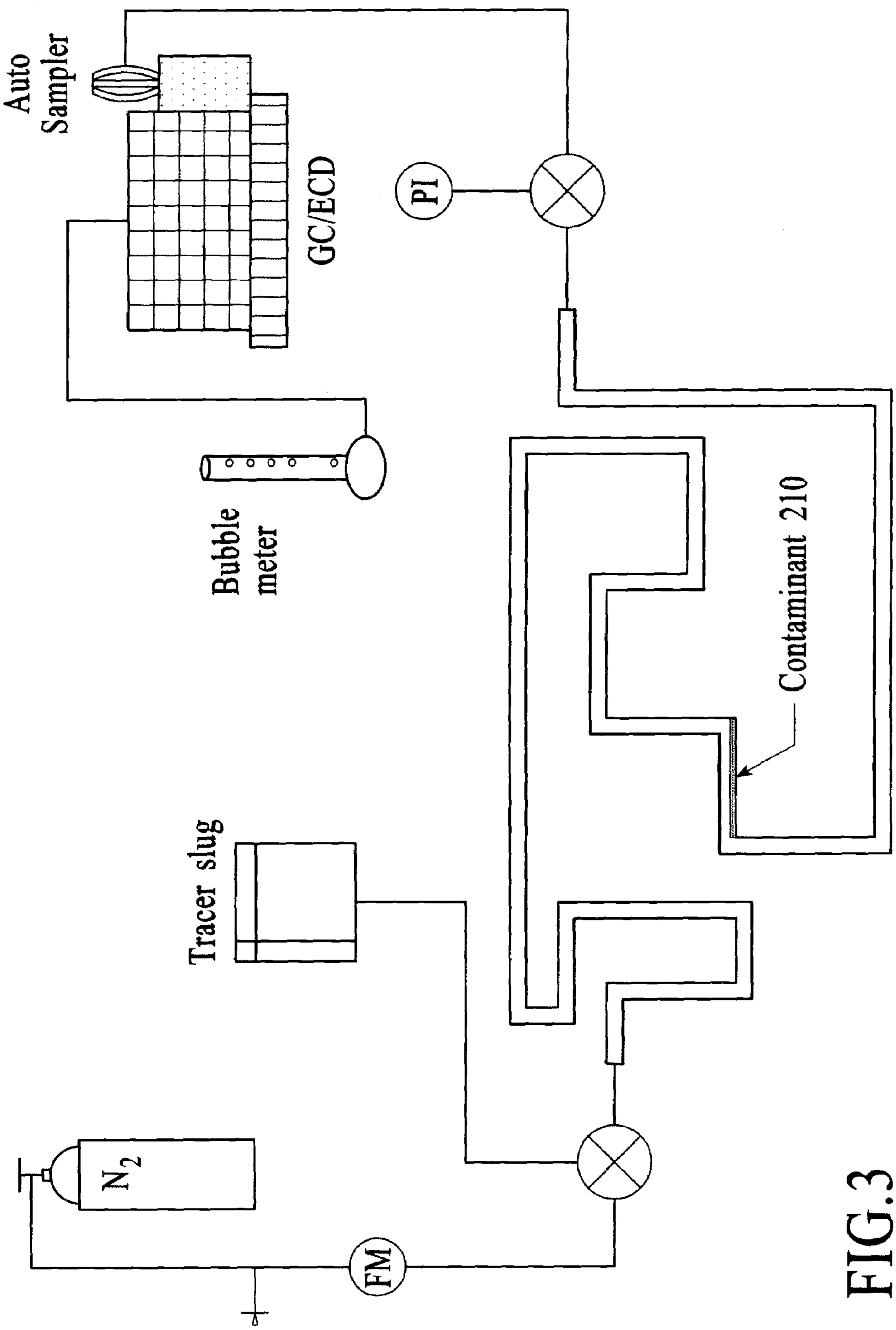
FIG. 3 illustrates the preferred embodiment of an apparatus of the present invention to determine whether or not contamination is present in a pipe or any fluid flow system.

FIG. 3 is an illustration of an apparatus of the present invention for application to a pipe, duct, or other enclosed flow system. Tracers, including at least one conservative tracer of known concentration and at least one partitioning tracer of known concentration are stored in a container under sufficient pressure that they can be injected into the pipe as a slug at a known but approximately constant concentration level. The pressurized container containing the tracers is connected to the pipe with a three-way valve that can be used to isolate the gas tracers from the pipe. Alternatively, two two-way valves can be used instead of the three-way valve so that both the tracers and the advection fluid can be independently isolated. A flowmeter or regulator can also be placed in the pipe between the valve and the pressure container. An air flow field is established in the pipe using a compressed gas cylinder. A regulator or flow meter is used to control the amount of tracer that is injected. The valve can also be used to isolate the advection gas from the pipe. The advection gas, which is nitrogen in the illustration, passes through a flow meter so that a set flow rate can be maintained. A timer is used to determine the volume of tracer injected into the pipe. A gas chromatograph (GC) is used at the extraction point to sample the tracers eluting from the pipe. A two-way valve is used to isolate the gas chromatograph from the pipe. The pressure in the pipe is measured using a pressure sensor. A computer is used to analyze the elution concentration curves of the tracers.

The method and an apparatus of the present invention was successfully demonstrated in laboratory pipe section using gaseous partitioning tracers. The two sets of laboratory tests that were conducted will be used to illustrate and describe the method of the present invention.

Figure 4:
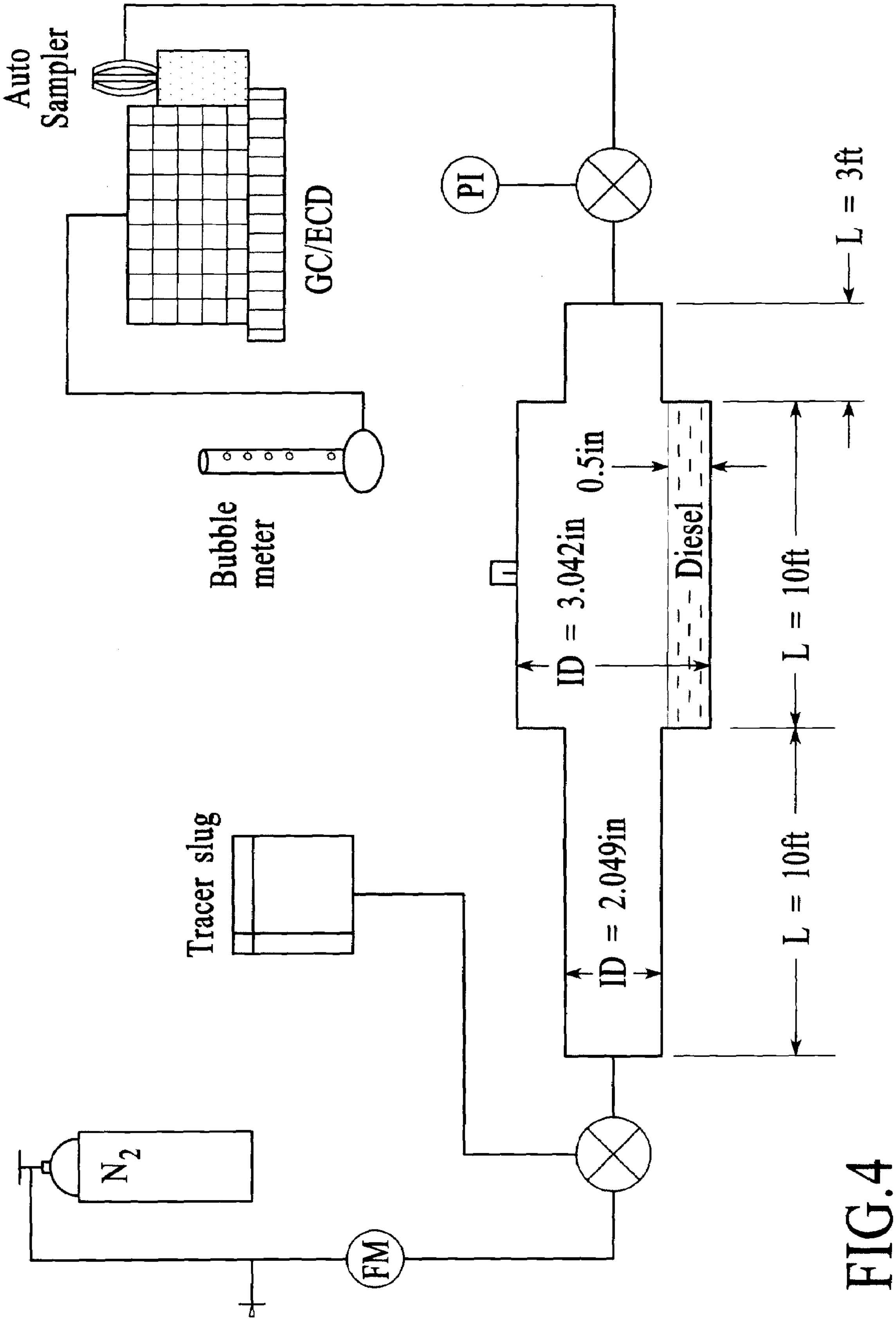
FIG. 4 illustrates the apparatus in FIG. 3 as applied to a laboratory pipe section.

FIG. 4 illustrates the application of the apparatus in FIG. 3 as used in the laboratory tests. The method was implemented on a 23 ft long, Schedule 40 PVC pipe. The 23-ft-section of pipe is comprised of 3 pipe sections. The first 10 ft of the pipe and the last 3 ft of pipe were assembled from 2-in.-diameter PVC pipe. The middle section of pipe, 10 ft in length, was assembled from 3-in.-diameter PVC pipe. The 3-in. diameter piping is equipped with a sample port at the midpoint to allow for contaminate introduction to the pipe and to draw gas samples during testing. Nitrogen gas was used to transport the tracers along the pipe.

The first set of tests was performed without any contamination in the 3-in.-diameter pipe section ("Uncontaminated Pipe Test") of the pipe. The second set of tests was performed with contamination in the pipe ("Contaminated Pipe Test"); the contamination consisted of a 0.5-in. thick, 1.5-L layer of diesel fuel in the 3-in.-diameter section of the pipe. Four tracers were used in each set of tests, but for purposes of illustration, only the results using three tracers will be described. $SF_6$ was selected as the conservative tracer. It does not partition into the diesel fuel and has a partitioning coefficient, $K_i$, of approximately 0. The other two tracers, $C_7F_{14}$ and $C_8F_{16}$, were selected, because they will each partition into the diesel but with different partitioning characteristics.

Both sets of tests were conducted in a similar manner. The tracers were slowly injected into the inlet of the 10-ft, 2-in.-diameter section of the pipe at a constant rate over a short period of time. The tracers were injected over a 10.3 min period in the first set of tests without the contamination present and over a 30-min period in the second set of tests with the diesel-fuel contamination present. The tracers were slowly advected along the pipe at a constant flow rate using nitrogen gas. A slow flow rate was used to insure that the tracers had sufficient time to partition into and out of the diesel fuel contamination The partitioning coefficients of each of the tracers were determined in bag tests. The values of $K_i$ were determined from bag tests and are shown in Table 1. It is clear that each of the tracers used in the test had significantly different values of $K_i$ and would have very different partitioning characteristics. For example, because the partitioning coefficient of $C_8F_{16}$ was greater than the partitioning coefficient of $C_7F_{14}$, it was expected that more of the $C_8F_{16}$ would partition into the diesel fuel than the $C_7F_{14}$, and it would take longer for the $C_8F_{16}$ to come back out of the diesel after the slug of tracer passed over the contamination. The test results show this.

TABLE 1

Partitioning Coefficients of the Three Tracers used in Both Sets of Tests

| Tracer Gas | Partitioning Coefficient, $K_i$ |
|---|---|
| $C_7F_{14}$ | 28.28 |
| $C_8F_{16}$ | 61.09 |

Uncontaminated Pipe Tests. Table 2 summarizes the concentration and mass of each tracer used in the uncontaminated pipe test. All of the tracers were injected into the pipe at the beginning of the test. The tracers were introduced into the pipe over a 10.3-min period at a rate of 26.08 L/h (434.6 mL/min). The total volume of tracers introduced was 4.49 L, which represents approximately 7 ft of the 2-in.-diameter pipe.

TABLE 2

Mass and Concentration of the Tracers Added to the Pipe for the Contaminated Pipe Tests

| Tracer Injection | Molecular Weight | Concentration (□g/g = ppm wt) | Mass Added (□g) |
|---|---|---|---|
| $SF_6$ | 146.0 | 0.72 | 3.680 |
| $C_7F_{14}$ | 350.1 | 11.61 | 76.186 |
| $C_8F_{16}$ | 400.1 | 11.68 | 76.623 |
| $N_2$ | 28.0 | | |

The uncontaminated pipe test was conducted over a period of 69.5 h. A total of 159 gas samples were collected and analyzed at the GC located at the outlet side of the pipe at approximately 26 min intervals throughout the test. The output of the GC in area counts was converted to concentration in ppm wt (□g/g) using a calibration curve developed for each tracer before the beginning of the test. The tracers were transported down the pipe at a constant flow rate of 0.66 L/h (11.0 ml/min) using nitrogen gas. In the 2-in.-diameter pipe, this corresponds to an average flow velocity of 30.6 cm/h (1.003 ft/h), and in the 3-in.-diameter pipe, this corresponds to an average flow velocity of 13.9 cm/h (0.46 ft/h). Table 3 shows the travel time over each section.

TABLE 3

Travel Time of the Tracers in the Contaminated Pipe Tests

| Pipe Section | Length of Pipe Section (ft) | No Contamination Travel Time (h) | Contamination Travel Time (h) |
|---|---|---|---|
| 2-in. Pipe | 10 | 9.97 | 10.61 |
| 3-in. Pipe | 10 | 21.96 | 20.96 |
| 2-in. Pipe | 3 | 2.99 | 3.18 |
| Total | 23 | 34.92 | 34.75 |

Figure 5:
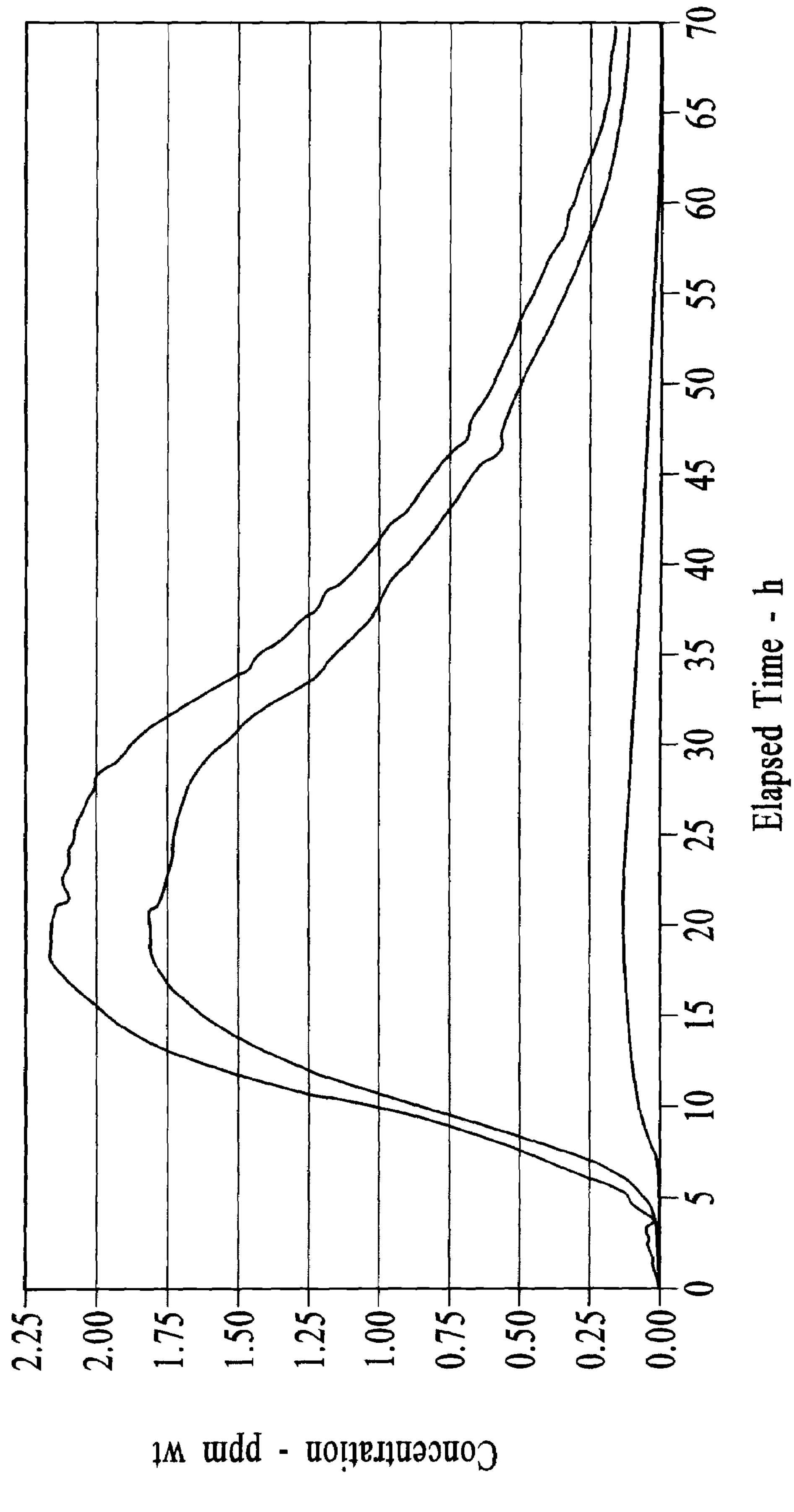
FIG. 5 illustrates the elution curve of tracer concentration for a conservative tracer, $SF_6$, and two partitioning tracers, $C_7F_{14}$ and $C_8F_{16}$, that were obtained in an uncontaminated laboratory pipe.

FIG. 5 shows the time history of the concentration curves for each tracer measured at the outlet of the pipe. The total mass of the tracer input to the system was given in Table 2. The concentrations of the partitioning tracers, $C_7F_{14}$ and $C_8F_{16}$, are about 15 times greater than the concentration of the conservative tracer $SF_6$. The concentration curves show that the maximum concentration is reached at 15 to 20 h after the beginning of the test. The concentration curves show the effects of dispersion due to the slow travel of the original tracer slug initially injected into the pipe.

If 100% of the tracer injected into the pipe is recovered by the end of the test, the area under the concentration curve (i.e., the integral of the concentration between 0 and infinity) shown in FIG. 5 should be equal to the initial concentration, $C_i$. This presumes that the duration of the test is long enough for all of the tracers that partition into the diesel fuel have time to elute into the flow field and arrive at the GC. Thus, $$C_i = \int_0^\infty C(t)dt \tag{4}$$

Figure 6:
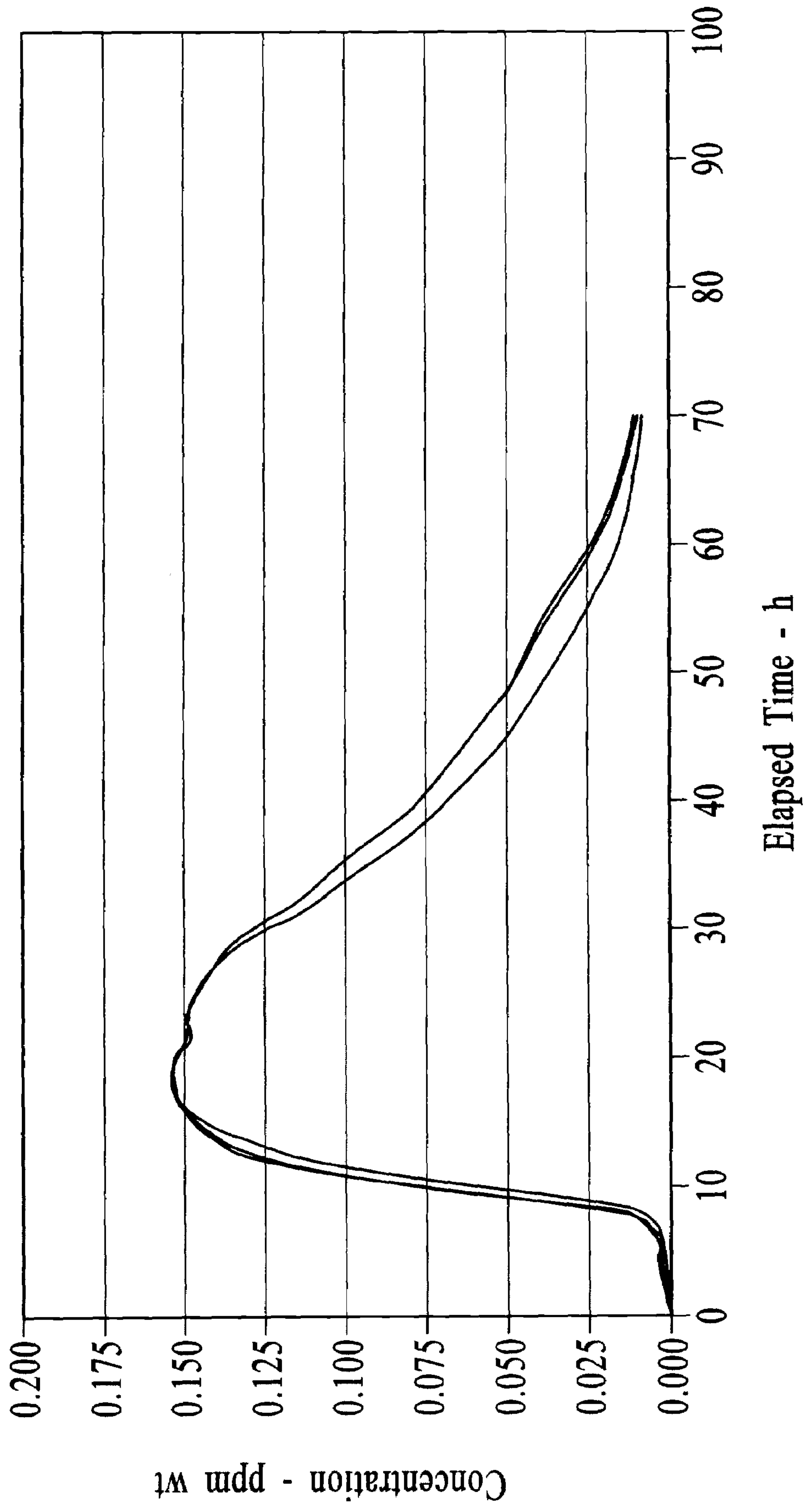
FIG. 6 illustrates the elution curve of the normalized tracer concentration of the partitioning tracers in FIG. 5.

FIG. 6 shows the concentration after normalizing the data by the initial concentration, $C_i$, of each of the respective tracers. The normalized elution curve of concentration is obtained by dividing the measured concentration by $C_i$. When each measured concentration is divided by the initial concentration, the integral of the concentration shown in FIG. 6 should equal 1 when all of the tracers are recovered. This is given by $$\frac{\int_0^\infty C(t)dt}{C_i} = 1 \tag{5}$$

The concentration curve for $C_7F_{14}$ is multiplied by 0.82 in FIG. 6 to account for a small calibration error.

Thus, if the dispersion characteristics of all of the tracer gases are the same and all of the tracer has had sufficient time to reach the GC at the outlet end of the pipe, the normalized concentration curves should be very similar. The normalized concentration curves of the conservative tracer, $SF_6$, and the partitioning tracers, $C_7F_{14}$ and $C_8F_{16}$, in FIG. 6 illustrate this similarity. Since the tails of the concentration curves have not yet reached a concentration of 0 ppm wt, not all of the tracer have yet been recovered.

An estimate of the mean travel time, $\langle t_p\rangle$ and $\langle t_c\rangle$, of the tracers in FIG. 6 can be computed from the centroid of the elution curves of tracer concentration using the following equation.

$$\langle t_{p\_or\_c}\rangle = \frac{\frac{\int tC(t)dt}{C_i}}{\frac{\int C(t)dt}{C_i}} \tag{6}$$

Table 4 summarizes the result of this calculation. Two estimates of $\langle t_{p\ or\ c}\rangle$ are presented. The first is the $\langle t_{p\ or\ c}\rangle$ computed from the curves in FIG. 6. The second is obtained by extrapolating the tail of the curves in FIG. 6 with an exponential function to insure that 100% of the tracer initially injected into the pipe has been recovered. In this instance, we would expect both estimates of $\langle t_{p\ or\ c}\rangle$ to be nearly identical, because the tails are close to zero.

TABLE 4

Mean Arrival Time of the Conservative and Partitioning Tracers in an Uncontaminated Pipe

| Tracer Gas | Measured $\langle t_{p\ or\ c}\rangle$ (h) |
|---|---|
| $SF_6$ | 28.09 |
| $C_7F_{14}$ | 29.24 |
| $C_8F_{16}$ | 29.07 |

Figure 7:
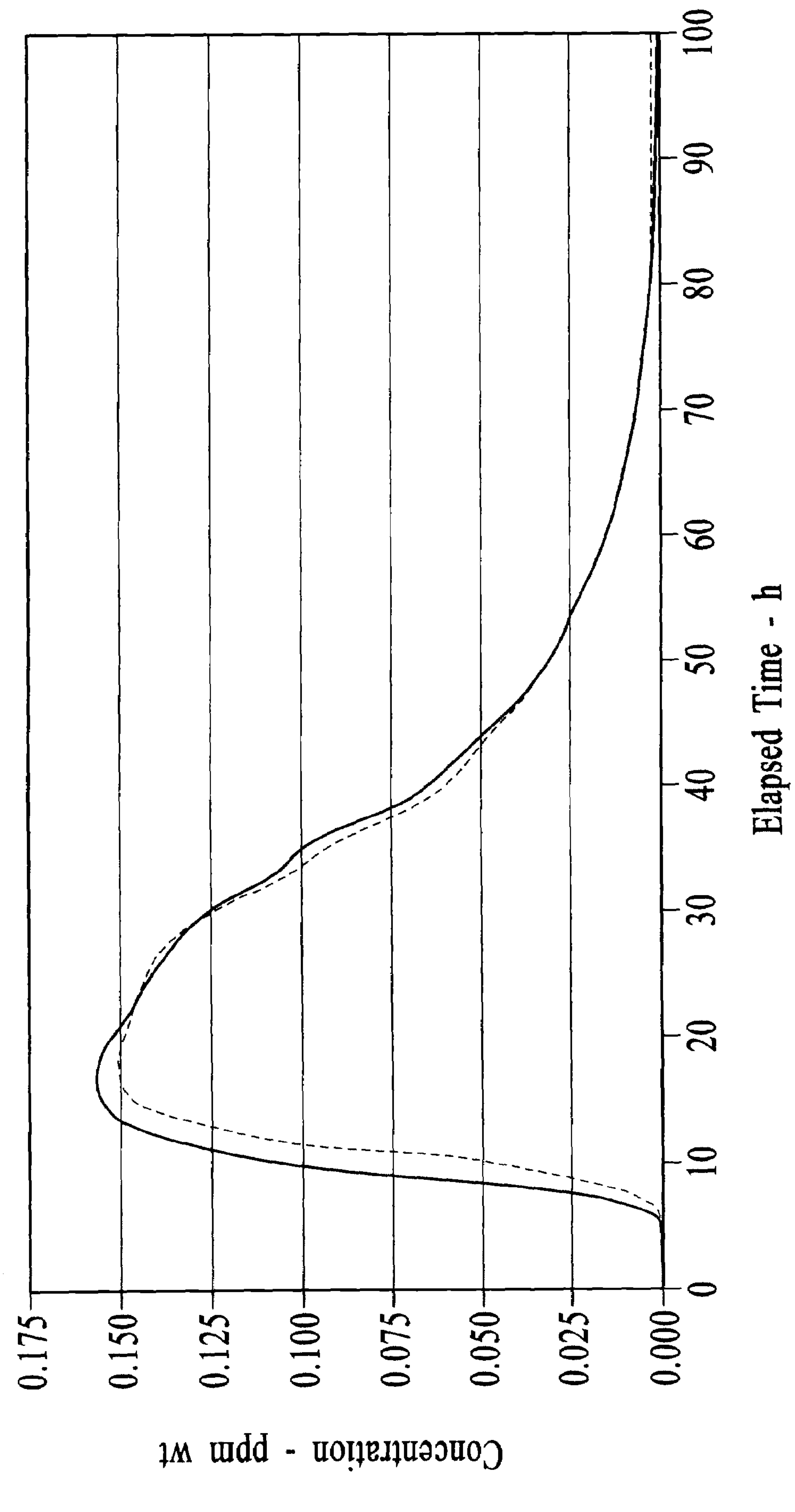
FIG. 7 illustrates the elution curves of the normalized tracer concentration for the conservative tracer, $SF_6$, obtained during the uncontaminated and contaminated pipe test.

FIG. 7 shows a comparison of the conservative tracer, $SF_6$, measured during the uncontaminated and contaminated pipe tests. Agreement between the two curves is very good. The small difference in the arrival of the leading edge is partially explained by the different advection velocity used in the two tests.

Contaminated Pipe Tests. The same procedure used to conduct the uncontaminated pipe tests was used to conduct the contaminated pipe tests. The main difference between the uncontaminated and the contaminated pipe tests was that 1.5 L of diesel fuel was added to the 3-in.-diameter pipe; this resulted in a 0.5-in. thick layer of contamination. The other difference was that the 4.49 L of tracer, the same volume of tracers used in the contaminated pipe tests, was introduced more slowly (i.e. over a longer period of time). All four tracers were again injected into the pipe at the beginning of the test. The tracers were introduced into the pipe over a 30-min period (vice 10.3 min in the uncontaminated pipe tests) at a rate of 8.98 L/h (149.7 mL/min). Again, the tracer slug occupied 7 ft of the 2-in.-diameter pipe. Table 5 summarizes the concentration and the mass of each tracer used in the contaminated pipe test.

TABLE 5

Mass and Concentration of the Tracers Added to the Pipe for the Contaminated Pipe Test

| Tracer Injection | Molecular Weight | Concentration (ppm wt) | Mass Added (□g) |
|---|---|---|---|
| $SF_6$ | 146.0 | 0.61 | 3.135 |
| $C_7F_{14}$ | 350.1 | 9.89 | 64.90 |
| $C_8F_{16}$ | 400.1 | 9.95 | 65.27 |
| $N_2$ | 28.0 | | |

The contaminated pipe test was conducted over a period of 185.6 h. A total of 419 gas samples were collected and analyzed at the GC located at the outlet side of the pipe at approximately 26.6-min intervals throughout the test. The tracers were transported down the pipe at a constant flow rate of 0.622 L/h (10.36 ml/min) using nitrogen gas. In the 2-in.-diameter pipe, this corresponds to an average flow velocity of 28.73 cm/h (0.943 ft/h), and in the 3-in.-diameter pipe with contamination present, this corresponds to an average flow velocity of 14.54 cm/h (0.477 ft/h). The flow velocity is approximately 1.96 times slower in the 3-in.-diameter pipe than in the 2-in.-diameter pipe. This is within 5% of the flow field used during the uncontaminated pipe tests. Table 3 shows the travel time over each section.

Figure 8:
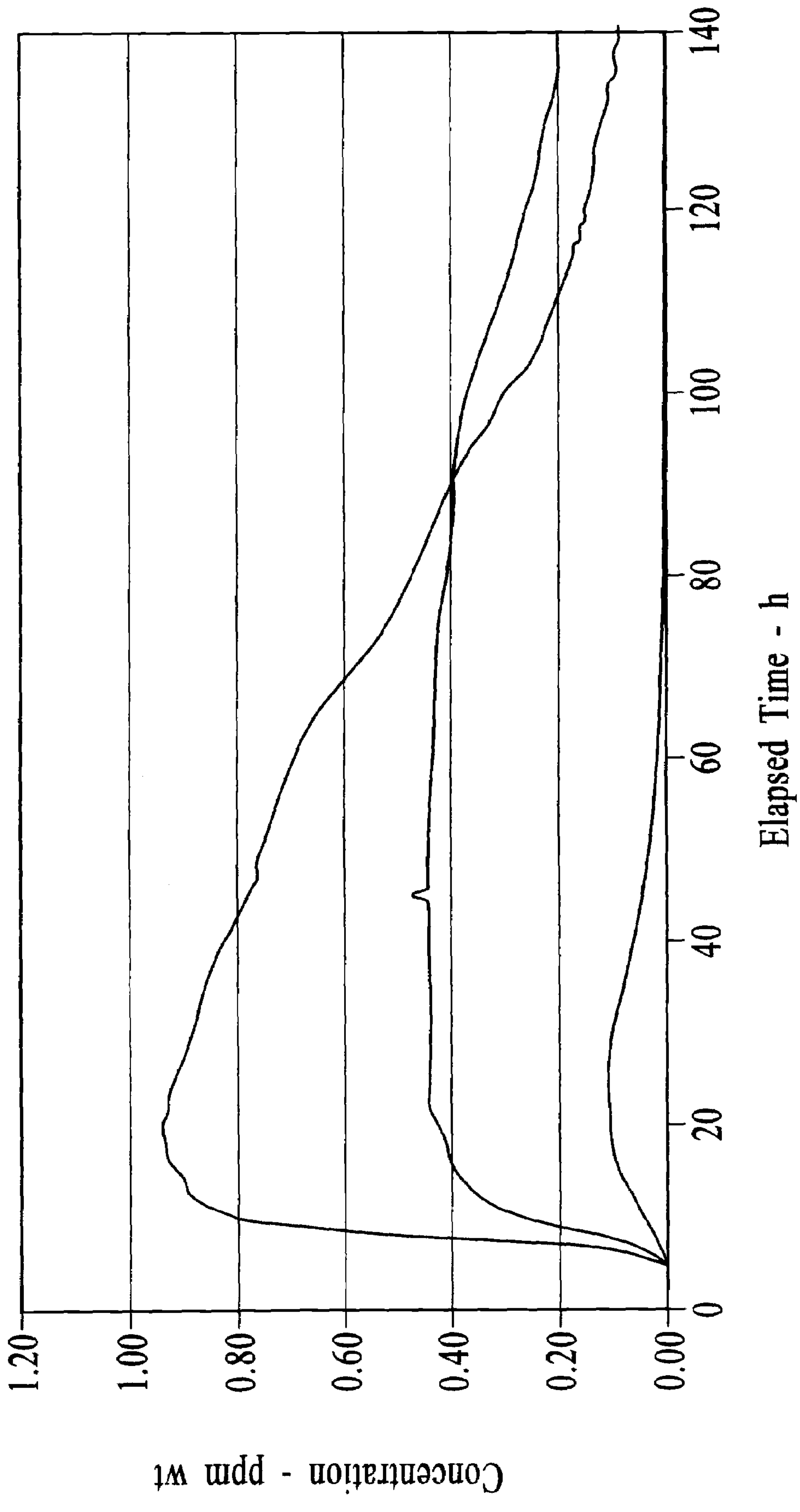
FIG. 8 illustrates the elution curve of tracer concentration for a conservative tracer, $SF_6$, and two partitioning tracers, $C_7F_{14}$ and $C_8F_{16}$, that partition in diesel fuel and were obtained in a laboratory pipe test using diesel fuel as the contaminant.

FIG. 8 shows the time history of the concentration of each tracer measured at the outlet of the pipe. The total mass of the tracer input to the system is given in Table 5. It is clear that the partitioning tracers ($C_7F_{14}$ and $C_8F_{16}$) behave differently than the conservative tracer ($SF_6$). This alone is an indication of the presence of a contaminant in the line. In contrast to the uncontaminated pipe test, FIG. 5, the conservative tracer is fully recovered well before the partitioning tracers, and the conservative tracer has a different shape (i.e., amplitude response) than the partitioning tracers.

Figure 9:
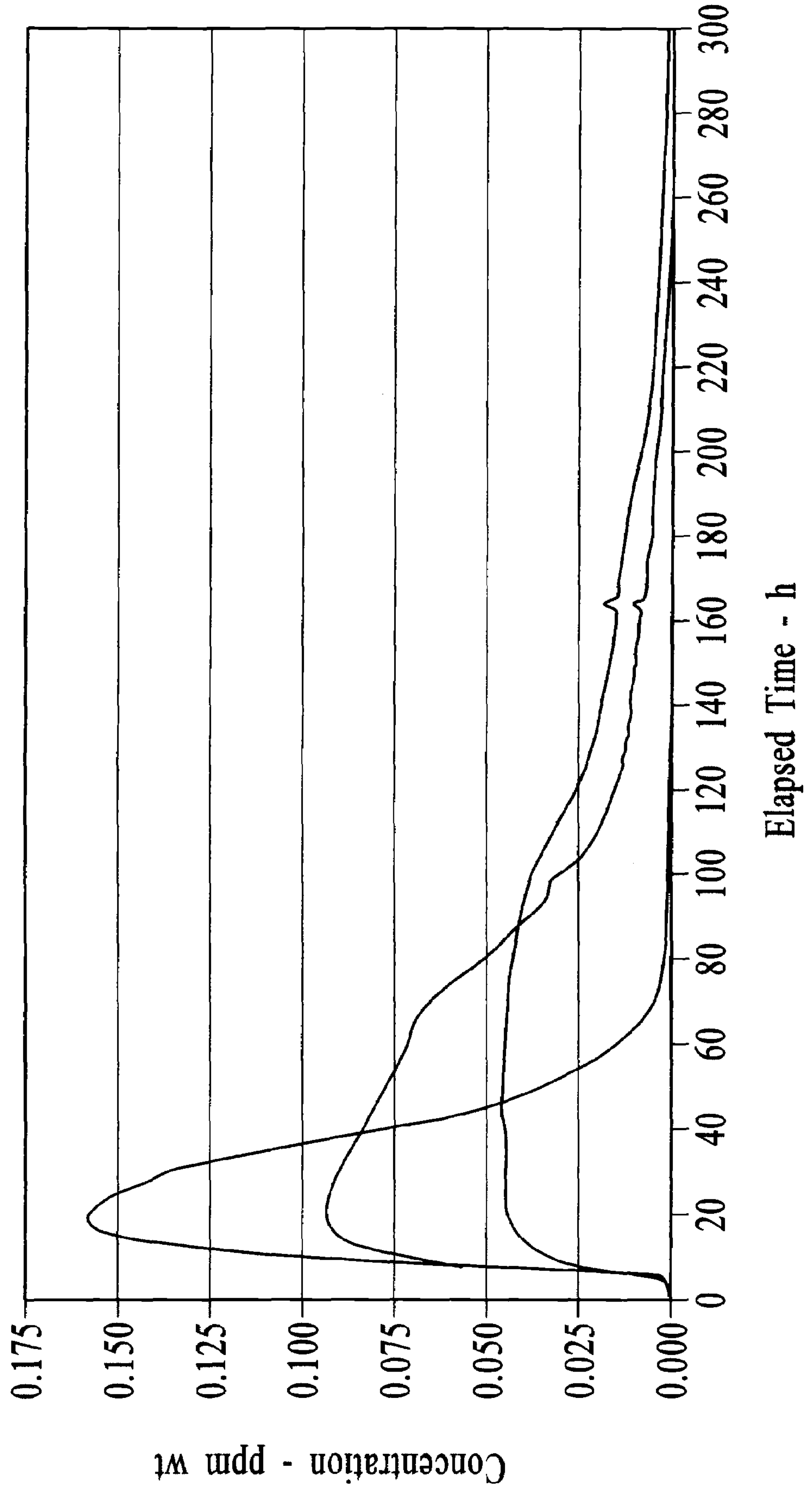
FIG. 9 illustrates the elution curve of the normalized tracer concentration of the partitioning tracers in FIG. 8.

This is better illustrated in the normalized curves shown in FIG. 9 obtained by dividing the measured concentration by the initial concentration. Based on these data, it is clear that the $SF_6$ and almost all of the $C_7F_{14}$ tracers have been recovered before the test was terminated. This observation is made because the exponential tails of both of these elution curves of concentration are very close to zero. Since the tail concentration curve for $C_8F_{16}$ indicates it is approaching zero, we could also use $C_8F_{16}$ in the analysis if we extrapolate the tail mathematically.

Table 6 summarizes an estimate of the mass of the tracers recovered by the end of the test based on the data collected. Two estimates were made. The first (Measurement of the Mass Recovered) were made based on the measurements of the mass of each tracer recovered. The second is based on an integration of the area under the concentration curves (Mass Recovered Based on the Data). An exponential curve was fit to the data from 100 h to 186 h and is shown as the thin lines in FIG. 9. The first estimate has a larger uncertainty than the second one. For example, it is safe to assume that nearly 100% of the $SF_6$ tracer was recovered by the end of the test, but the measurement estimate showed only 81.8% recovery. This is because there is a large uncertainty in the estimate of the recovered volume of $SF_6$. The concentration curve in FIG. 9 shows that the tail reached zero before the completion of the test. This was nearly true for the $C_7F_{14}$ as well.

TABLE 6

Summary of the Total Mass of Each Tracer Recovered During the Contaminated Pipe Test

| Tracer Gas | Mass Added (□g) | Mass Recovered (□g) | Measurements of the Mass Recovered (%) | Mass Recovered Based on Data (%) |
|---|---|---|---|---|
| $SF_6$ | 3.14 | 2.57 | 81.8 | ~100% |
| $C_7F_{14}$ | 64.90 | 57.64 | 88.8 | 99.3% |
| $C_8F_{16}$ | 65.27 | 44.98 | 68.9 | 93.9% |
| $C_{10}F_{18}$ | 65.10 | 20.97 | 32.2 | N/A |

The mean travel time of the tracers in the contaminated pipe test is compared to the mean travel time in the uncontaminated pipe test is presented in Table 3. The presence of the contamination reduces the mean travel time by approximately 1 h over the contaminated section of the pipe.

Figure 10:
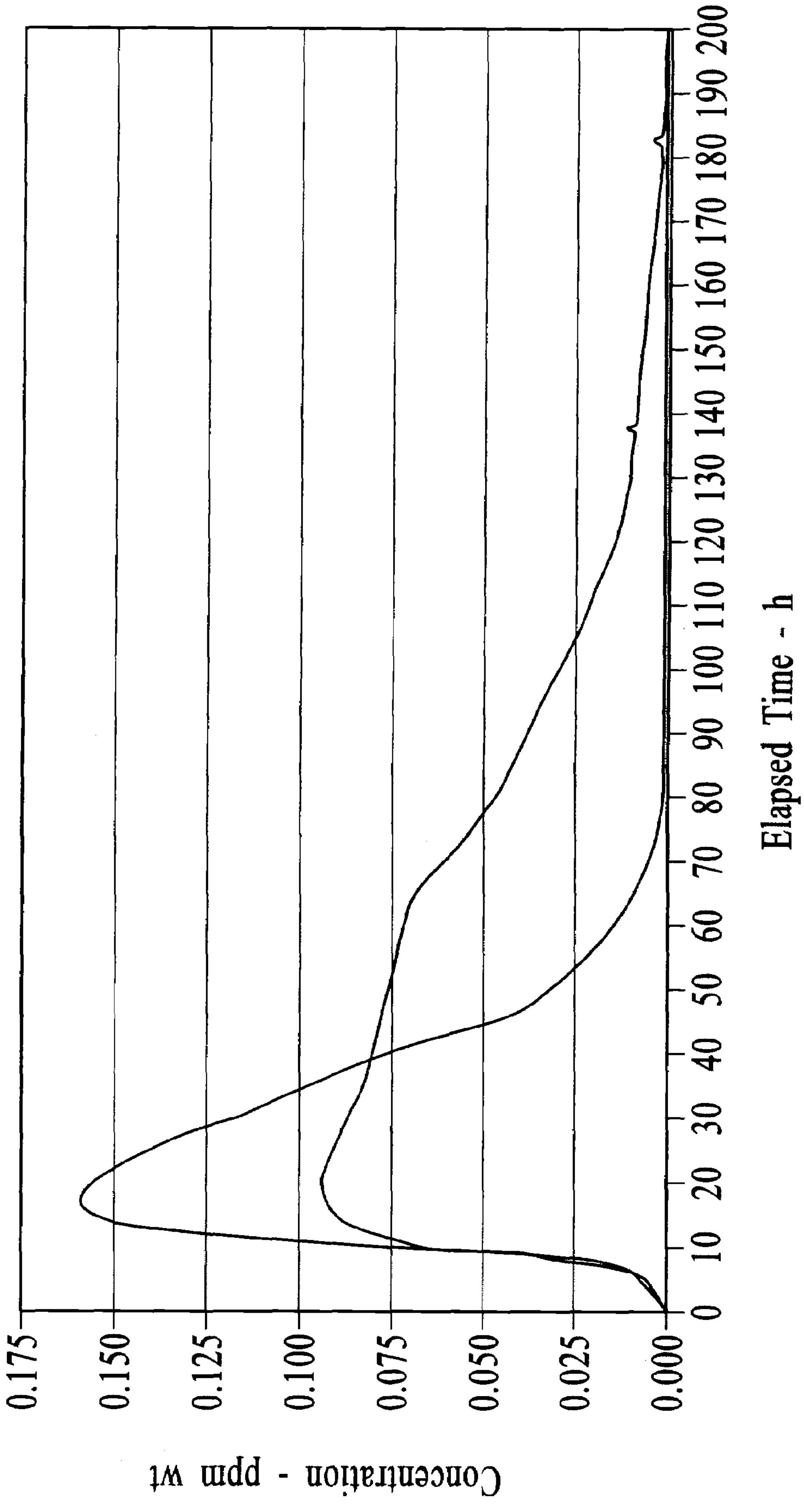
FIG. 10 illustrates the elution curve of tracer concentration for the conservative tracer, $SF_6$, and the partitioning tracer, $C_7F_{14}$, shown in FIG. 9.

FIG. 10 shows a comparison of the conservative tracer $SF_6$ and the partitioning tracer $C_7F_{14}$. A number of observations are noteworthy. The same observations are also true for $C_8F_{16}$ in FIG. 9.

First, the initial arrival time of both tracers, as illustrated by the leading edge of the concentration curve, is approximately the same.

Second, the peak of the partitioning tracer, $C_7F_{14}$, is significantly lower than the conservative tracer $SF_6$. It is clear that the $C_7F_{14}$ has an affinity for the diesel fuel and the partitioning into the diesel occurs very quickly. The difference in the peak amplitudes between the conservative and partitioning tracers can be exploited in the development of a detection algorithm.

Third, the conservative tracer indicates the travel time of the initial slug of tracers injected into the pipe. After 70 h, all of the initial tracer material (both conservative and partitioning tracers) should have total traveled the entire length of the pipe. Any tracer concentration being measured after this time is an indication that tracer is still being released from the diesel fuel.

Fourth, the peak of the partitioning tracer is much broader than the peak of the conservative tracer. The conservative tracer is affected only by dispersion as it is transported along the pipe. The partitioning tracer is also includes this affect, but is dominated by the partitioning of the $C_7F_{14}$ tracer into and out of the diesel fuel. The partitioning tracer remains approximately constant for many hours and then falls off exponentially. These same observations are true of the other two partitioning tracers.

Fifth, as exhibited by the exponential tail of the concentration curve, the partitioning of the tracers like $C_7F_{14}$ from the diesel back into the flow field occurs slowly.

An estimate of the mean travel time, $\langle t_p \rangle$ and $\langle t_c \rangle$, of the tracers in FIG. 9 was computed from the centroid of the elution curves of tracer concentration using Eq. 6.

Table 7 summarizes the result of this calculation. Two estimates of $\langle t_{p\ or\ c} \rangle$ are presented. The first is the $\langle t_{p\ or\ c} \rangle$ computed from the data portion of the concentration curves in FIG. 9. The second is obtained by extrapolating the tail of the concentration curves in FIG. 9 with an exponential function to insure that 100% of the tracer initially injected into the pipe has been recovered. For $C_7F_{14}$, we would expect both estimates of $\langle t_p \rangle$ to be nearly identical, because the tails are close to zero.

TABLE 7

Mean Arrival Time of the Conservative and Partitioning Tracers in an Uncontaminated Pipe

| Tracer Gas | Measured $\langle t_{p\ or\ c} \rangle$ (h) | Extrapolated $\langle t_{p\ or\ c} \rangle$ (h) |
|---|---|---|
| $SF_6$ | 27.52 | 27.52 |
| $C_7F_{14}$ | 54.78 | 56.35 |
| $C_8F_{16}$ | 71.45 | 84.74 |

Table 8 presents the results of the volume of the diesel contamination estimated using Eq. (3) and the values of $K_i$ from Table 1 and the values of $\langle t_{sF6} \rangle$, $\langle t_{C7F14} \rangle$, and $\langle t_{C8F16} \rangle$ from Table 7. The error is only 6.4% when the $C_7F_{14}$ tracer is used.

TABLE 8

Estimation of the Volume of the 1.5 L of Diesel Fuel Contamination

| Tracer Gas | $K_i$ | $\langle t_{SF6}\rangle$ (h) | $\langle t_{C7F14}\rangle$ or $\langle t_{C7F14}\rangle$ (h) | $S_{DPipe}$ (L) | Error (%) |
|---|---|---|---|---|---|
| $C_7F_{14}$ | 28.28 | 27.52 | 56.34 | 1.40 | 6.4% |
| $C_8F_{16}$ | 61.09 | 27.52 | 84.74 | 1.29 | 13.7% |

In an operational scenario, it is best to determine if the pipe is contaminated in as short a period of time as possible, and if it is, then to collect sufficient data to verify the detection, quantify the volume of the contamination, and then locate the contamination. While volume measurements and detection verification using partitioning tracers will require that enough of the tail region of the elution curves of the partitioning tracer concentration be collected (to extrapolate the tail of the curve to zero), this is not be the case for the initial detection or the location of the contaminant. Since the location measurement requires a perturbation of the flow field, it is best accomplished after the volume measurement has been made or if the volume measurement is not to be made.

While there are a number of detection algorithms that might be developed, the most straightforward is to exploit the difference in amplitude between the conservative and one or more of the partitioning tracers at the peak region of the elution curves of the conservation tracer concentration. This approach can be used with both reactive and partitioning tracers. This can be accomplished by integrating under the conservative and non-conservative tracer concentration curves and differencing the results until the difference is statistically significant. It is important not to allow small time differences in the leading edge of the curves to bias the algorithm. Alternatively, enough data can be collected first to identify the maximum amplitude of the conservative tracer and analyze the data in this region. At this point in time, the second approach is the most practical to use. Once some operational experience is obtained, however, the former approach can be implemented. Both approaches will give the same result, but the former will be accomplished in a short measurement period.

Figure 11:
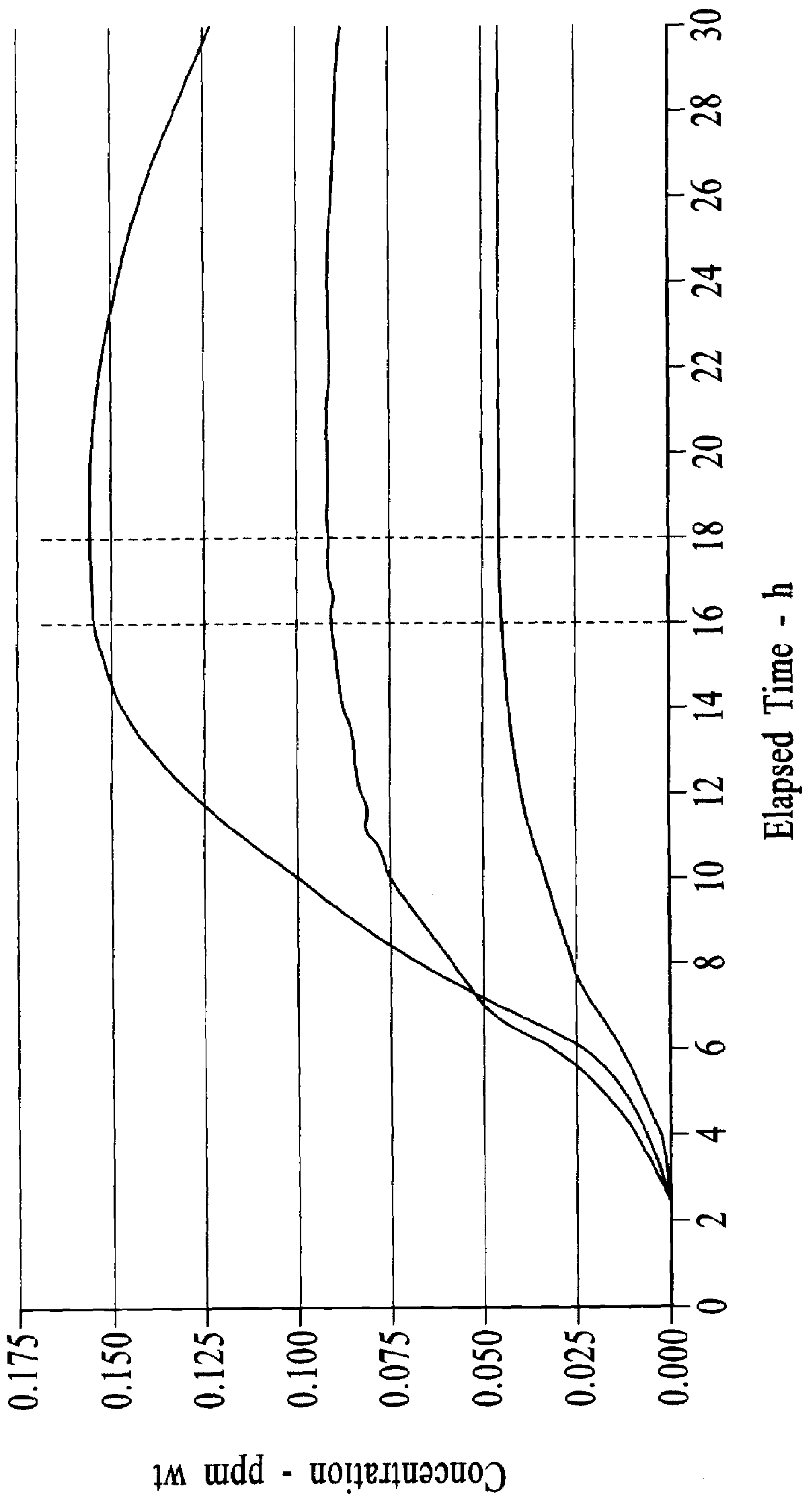
FIG. 11 illustrates the elution curves of the normalized concentration of the first 30 h of the conservative tracer, $SF_6$, and the partitioning tracers, $C_7F_{14}$ and $C_8F_{10}$ in FIG. 9.

FIG. 11 shows only the first 30 h of the normalized concentration curves for $SF_6$, $C_7F_{14}$, and $C_8F_{16}$ shown in FIG. 9. The main difference between the conservative and partitioning tracer curves is amplitude. No information with regard to the shape of the curve is apparent. Detection is accomplished by first identifying a short region in time centered on the peak concentration of the conservative tracer to compute the mean amplitude of each concentration curve. The dashed lines, at 17.6 and 20.2 h, bracket a 2.4-h period centered on the peak of the conservative tracer ($SF_6$). The mean amplitude can be computed for each curve over this 2.4-h period. The mean difference in concentration (in ppm wt) between each of the partitioning tracers and the conservative tracer represents the output of the system (designated Output of PCUT-1). Table 9 summarizes the results. It should be pointed out that the mean could have been computed over a shorter period than 2.4 h without changing the result. The ratio of the means between each partitioning tracer and the conservative tracer $SF_6$ in dB is also shown in Table 9 (Output of PCUT-2).

TABLE 9

Summary of the Output of the Detection Measurement

| Tracer Gas | Mean Amplitude (ppm wt) | Output of PCUT-1 Difference in Mean Amplitude (ppm wt) | Output of PCUT-2 Ratio of Mean Amplitudes (dB*) |
|---|---|---|---|
| $SF_6$ | 0.156 | 0 | 0 |
| $C_7F_{14}$ | 0.092 | 0.065 | −2.3 |
| $C_8F_{16}$ | 0.042 | 0.114 | −5.7 |

*10 $\log_{10}$ (Difference in Mean Amplitudes)

Figure 12:
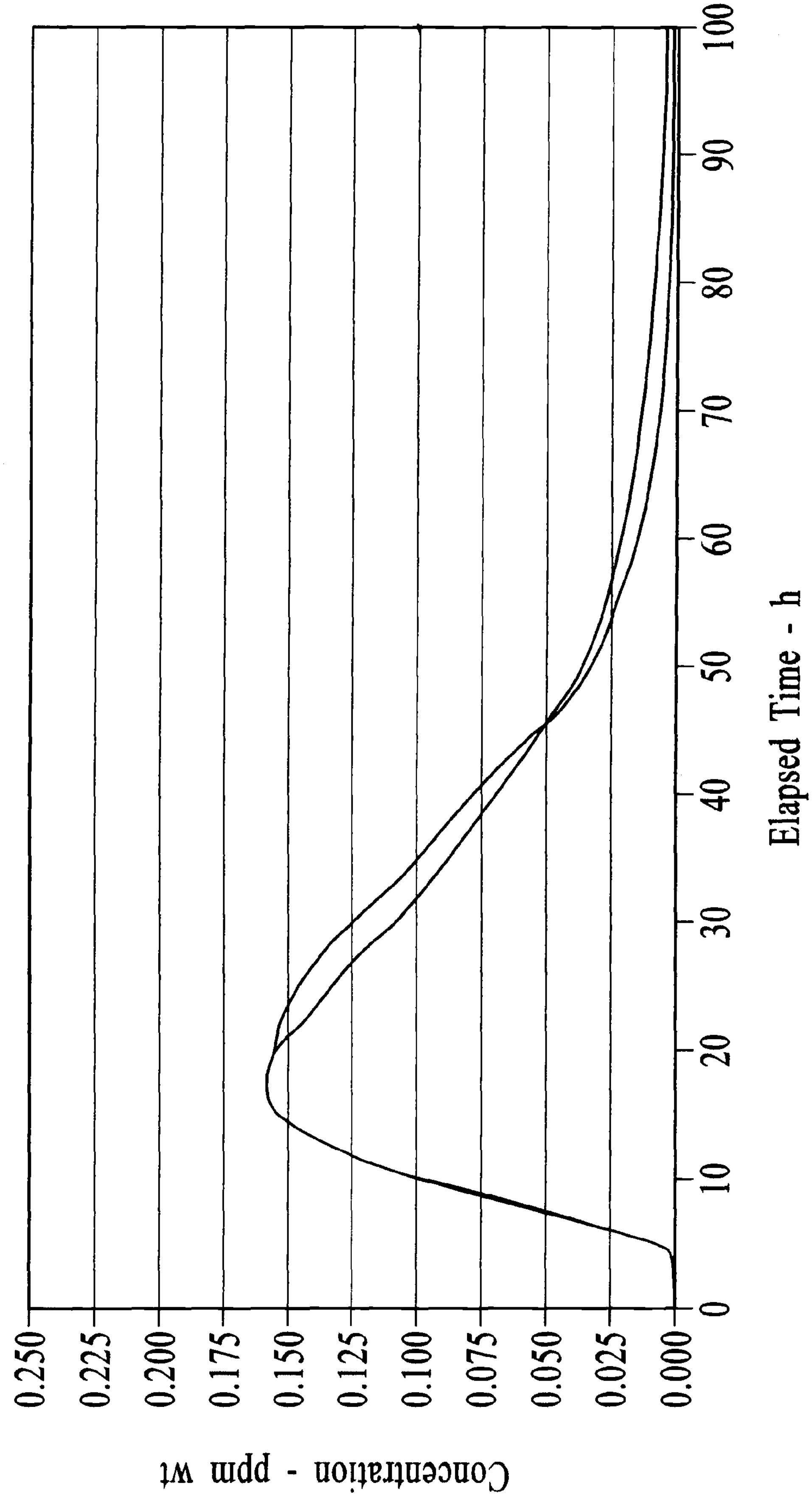
FIG. 12 shows a comparison between the output from advection-diffusion flow model and measured normalized concentration curve for the conservative tracer, $SF_6$.

Model Estimates of the Advection and Dispersion of the Tracers. A one-dimensional convective-diffusion (dispersion) model can be used to describe the flow of a conservative substance in a pipe. Eq. (7) is a solution for a finite volume of substance injected into a pipe and transported at a steady and uniform flow rate with a constant longitudinal-dispersion coefficient.

$$\langle C_A(x,t)\rangle = \beta\left[\frac{M}{\rho A(4\pi E_T t)^{0.5}}\right]^{\frac{-(x-L/t)^2}{4\pi E_T t}} \tag{7}$$

where M is the mass of the tracer material introduced, □ is density of the tracer mixture=the mass of the mixture divided by the volume of the tracer mixture, A is the cross-section area of the flow, $E_T$ is the one-dimensional longitudinal dispersion coefficient, x is the distance along the length of the pipe section, t is the time after introducing the tracer, U is the average velocity of flow along the pipe. This model was used to estimate $E_T$, and once $E_T$ was estimated, the model was used to predict the flow of the conservative tracers for different U. FIG. 12 shows a comparison of the model output, $\langle C_A(x=23\ \text{ft},t)\rangle$ for $C_7F_{14}$ and the measured concentration curve for $C_7F_{14}$ at the GC, 23 ft from the tracer injection point as a function of time. Agreement is very good.

Figure 13:
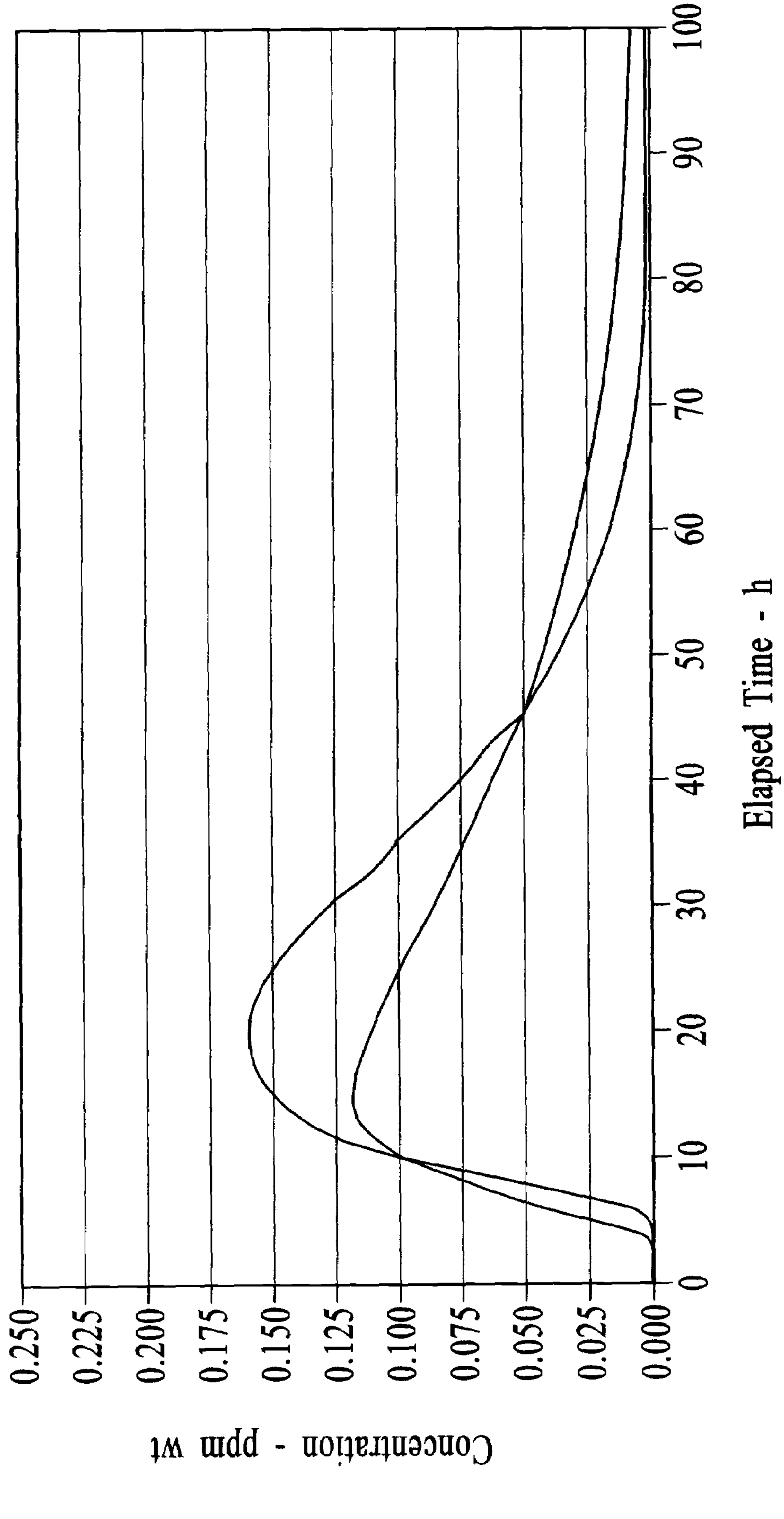
FIG. 13 shows a comparison between the output from advection-diffusion flow model and measured normalized concentration curve for the conservative tracer, $SF_6$, after the diffusion coefficient, $E_T$, was doubled.
Figure 14:
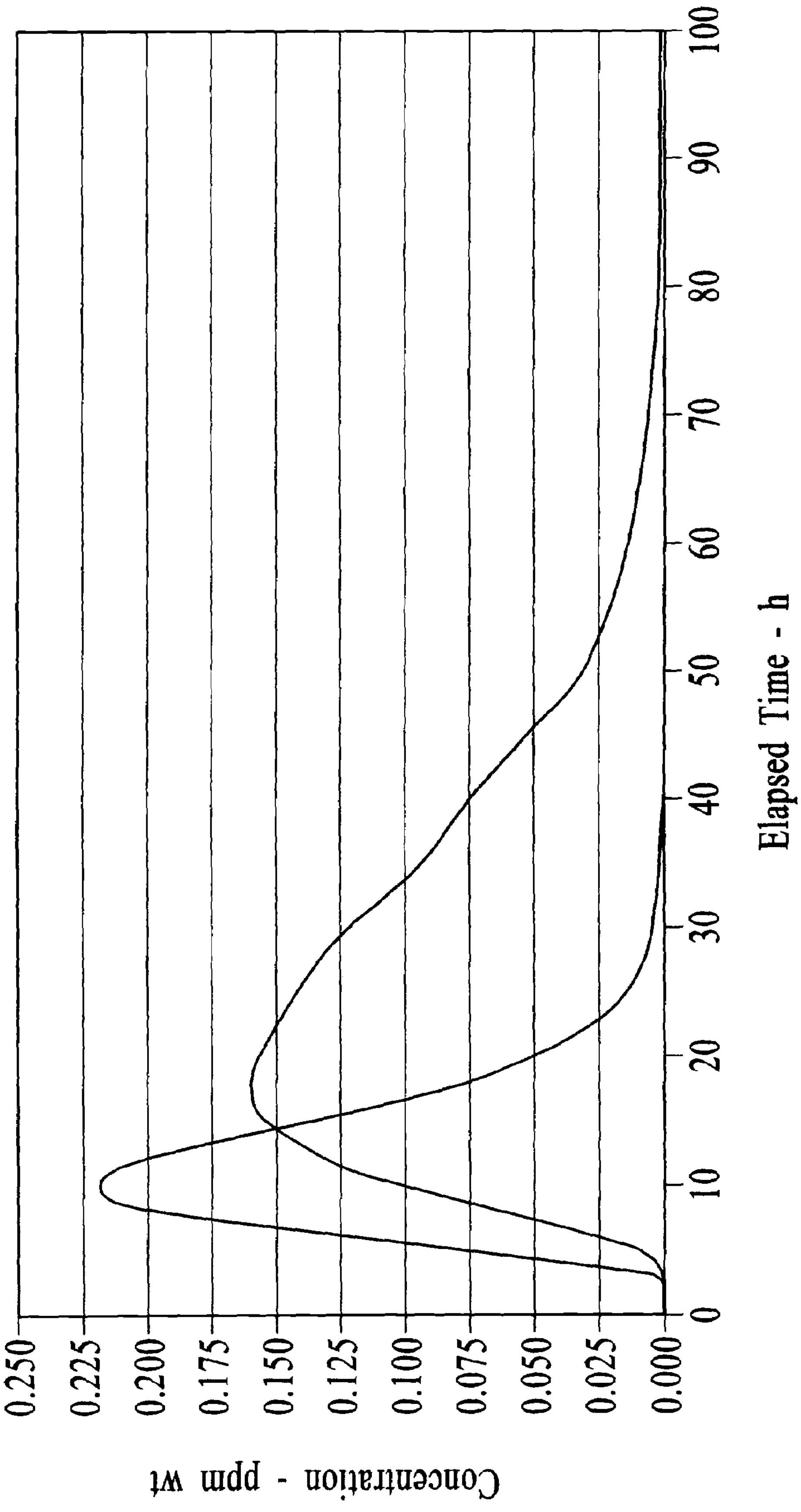
FIG. 14 shows a comparison between the output from advection-diffusion flow model and measured normalized concentration curve for the conservative tracer, $SF_6$, after the advection velocity, U, was doubled.

FIGS. 13 and 14 illustrate the effects of a flow field with a more rapid flow field and a larger dispersion coefficient, respectively. The values of U and $E_T$ were doubled. The model concentration curve in FIG. 13 exhibits more dispersion (as compared to the measured concentration curve for $C_7F_{14}$) with the larger diffusion coefficient, $E_T$. Doubling the advection velocity would allow the test to be completed is less time. The model concentration curve in FIG. 14 exhibits a quicker time of arrival (as compared to the time of arrival of the measured concentration curve for $C_7F_{14}$).

Figure 15:
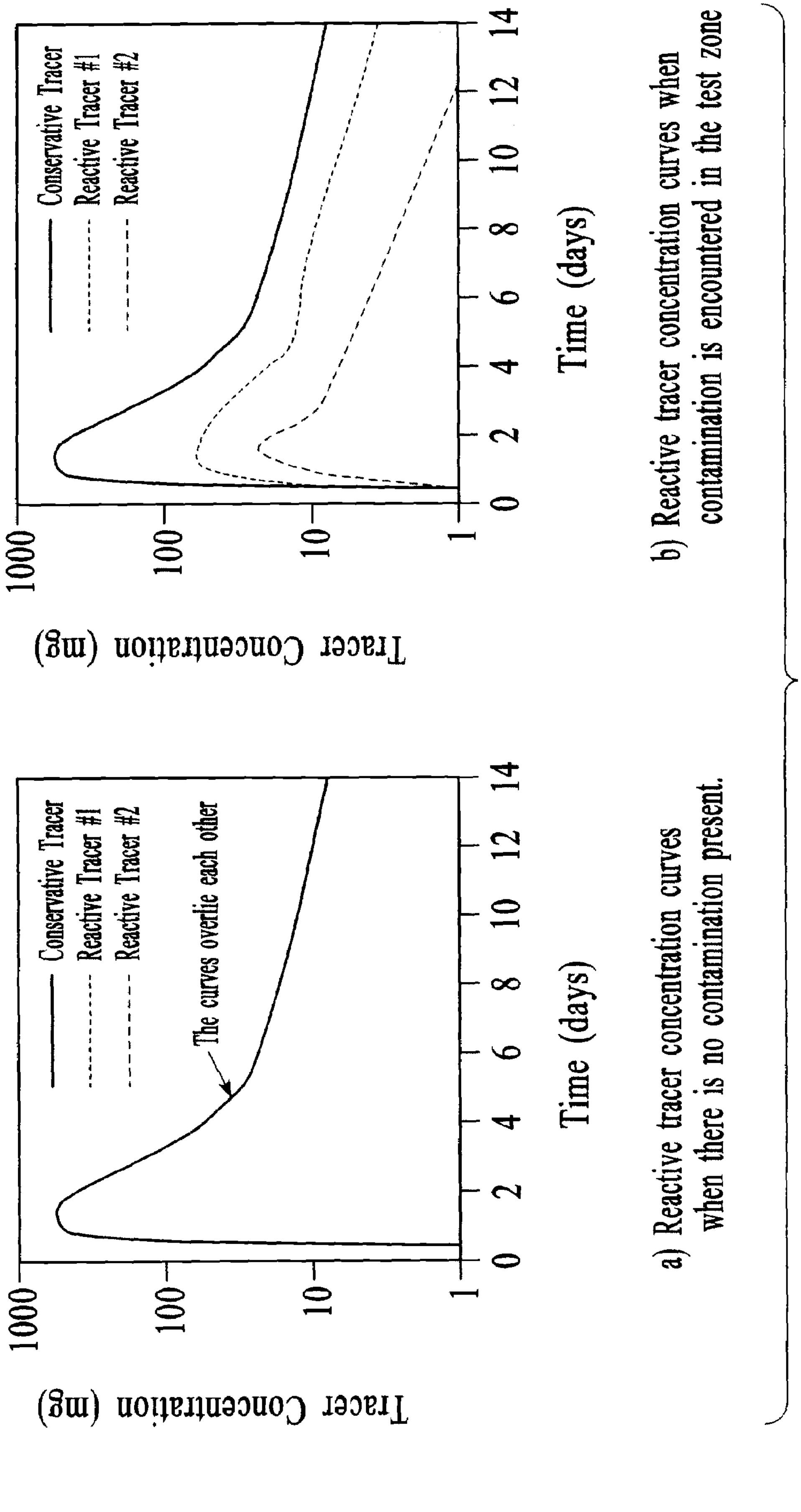

Reactive tracers can be used in a similar manner to partitioning tracers. A suite of tracers consisting of at least one tracer that is conservative i.e. does not react with the contaminant of interest and one or more tracers that reacts to the contaminant would be injected as a slug into the pipe. The tracer slug would be transported or advected through the pipe using a gas that does not interact with the tracers. When the reactive tracers come in contact with the contamination in the pipe, rather than partitioning into the contaminant and diffusing out of the contamination, the reactive tracers would react with the contaminant of interest and either change form or be partially consumed by the contamination. FIG. 15 illustrates a computer model illustration estimate of the tracer concentration curves measured at the extraction point with a GC for a test in a contaminated pipe and uncontaminated pipe. The results for the conservative tracer and the reactive tracers are similar to those of the partitioning tracers for a test in an uncontaminated pipe. There are two important differences between the reactive concentration curves and the partitioning tracer concentration curves when the contamination is present. First, the total injected concentration of the reactive tracers is not recovered over time as it is for partitioning tracers. Second, all of the reactive tracers have the same mean time of arrival while the partitioning tracers have different mean arrival times. The reactive tracers have the same mean time of arrival in both the uncontaminated and contaminated pipe tests. FIG. 15 suggests that tests involving reactive tracers should be shorter than those using partitioning tracers, because the partitioning tracers do not have to diffuse out of the contamination.

For the scenario where the tracers are consumed by the contaminant, it should still be possible to estimate the contaminant volume based upon the amount of tracer detected in the effluent of the pipe. The ratio between the injected concentration and the measured concentration should be related to the amount of contamination present, with consideration given to the effects of the reaction rate. When more contamination is present the concentration should be reduced from the scenario of both a clean pipe and a pipe with a small amount of contamination.

For the scenario where a tracer reacts with the contaminant of interest and changes form, determination of the contamination volume may be difficult. We will investigate this possibility, but the focus will be finding ways to simply detect the presence of the contaminant by using a conservative tracer and at least one reactive tracer. The presence of the conservative tracer provides the time base for test control as well as the percent recovery to ensure that the flow field is fully captured. Ideally, the reaction between the tracer and the contaminant will be quick, and the change will only occur while the tracer slug is in contact with the contaminant. Slow reactions my take a while to elute from the system.

The method of the present invention also works similarly for liquid-filled fluid flow systems and liquid tracers. The application of liquid tracers, like those of gaseous tracers, requires that a suitable tracer be found that interacts (reacts or partitions) into the contamination. Because of the subsurface characterization using of partitioning tracers, many suitable tracers have been identified for use in pipes and ducts. In fact, many of the contaminants found in the subsurface are released from leaking pipes.

What is claimed is:

1. A method for determining the quantity of a contaminant in a fluid flow system, comprising the steps of:

(a) isolating a section of the flow system with at least two valves to form an isolated section, wherein the flow system is a pipe or duct that is at least partially filled with a gas, and the valves isolate the section of the pipe or duct from other sections of the pipe or duct;

(b) injecting a gaseous conservative tracer and a gaseous interactive tracer into the isolated section of the flow system at a first location, wherein the interactive tracer is a partitioning tracer;

(c) advecting the tracers along the isolated section of the flow system in gas phase with an advection gas;

(d) extracting the tracers at a second location in the flow system;

(e) measuring the concentration of the extracted tracers over a period of time; and (f) characterizing the contaminant from the concentrations of the tracers, wherein the quantity of extracted tracer is related to the quantity of contaminant.

2. The method of claim 1 wherein the quantity of the contaminant in the fluid flow system is determined from the time of arrival of the conservative tracer and the interactive tracer.

3. The method of claim 1 wherein a plurality of interactive tracers is injected.

4. The method of claim 1 wherein the quantity of contaminant is determined from a comparison of characteristic features of the measured concentrations of the conservative and interactive tracers.

5. The method of claim 2 wherein the quantity of the contaminant is determined from the ratio of the mean times of arrival of the interactive tracer and the conservative tracer.

6. The method of claim 4 wherein the mean arrival times of the interactive tracer and the conservative tracer are determined from the centroid of the tracer concentration curves.

7. The method of claim 4 wherein the comparison is accomplished using tracer concentration curves that represent only a fraction of the total concentration curves that would have been measured if the collection time were extended.

8. The method of claim 7 wherein the comparison is accomplished by mathematically extrapolating the concentration curves.

9. The method of claim 1 further comprising the step of applying a factor accounting for the geometry of the fluid flow system.

10. The method of claim 4, wherein the characteristic features include the magnitude of the measured tracer concentrations in a region of the concentration curves selected from the group of regions consisting of the peak, the leading edge, and the trailing edge of the curves.

11. A method for determining the quantity of a contaminant in a fluid flow system, comprising the steps of:

(a) isolating a section of the flow system with at least two valves to form an isolated section, wherein the flow system is a pipe or duct that is at least partially filled with a gas, and the valves isolate the section of the pipe or duct from other sections of the pipe or duct;

(b) injecting a gaseous conservative tracer and a gaseous interactive tracer into the isolated section of the flow system at a first location, wherein the interactive tracer is a reactive tracer;

(c) advecting the tracers along the isolated section of the flow system in gas phase with an advection gas;

(d) extracting the tracers at a second location in the flow system;

(e) measuring the concentration of the extracted tracers over a period of time; and (f) characterizing the contaminant from the concentrations of the tracers, wherein the quantity of extracted tracer is related to the quantity of contaminant.

12. The method of claim 11 wherein the quantity of the contaminant in the fluid flow system is determined from the time of arrival of the conservative tracer and the interactive tracer.

13. The method of claim 11 wherein a plurality of interactive tracers is injected.

14. The method of claim 11 wherein the quantity of contaminant is determined from a comparison of characteristic features of the measured concentrations of the conservative and interactive tracers.

15. The method of claim 12 wherein the quantity of the contaminant is determined from the ratio of the mean times of arrival of the interactive tracer and the conservative tracer.

16. The method of claim 15 wherein the mean arrival times of the interactive tracer and the conservative tracer are determined from the centroid of the tracer concentration curves.

17. The method of claim 14 wherein the comparison is accomplished using tracer concentration curves that represent only a fraction of the total concentration curves that would have been measured if the collection time were extended.

18. The method of claim 17 wherein the comparison is accomplished by mathematically extrapolating the concentration curves.

19. The method of claim 11 further comprising the step of applying a factor accounting for the geometry of the fluid flow system.

20. The method of claim 14, wherein the characteristic features include the magnitude of the measured tracer concentrations in a region of the concentration curves selected from the group of regions consisting of the peak, the leading edge, and the trailing edge of the curves.

* * * * *